United States Patent
He et al.

(10) Patent No.: US 11,572,520 B2
(45) Date of Patent: *Feb. 7, 2023

(54) LOW PROFILE LUBRICANTS FOR DATA STORAGE DEVICES

(71) Applicant: Western Digital Technologies, Inc., San Jose, CA (US)

(72) Inventors: Xingliang He, Fremont, CA (US); Bala Krishna Pathem, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/193,954

(22) Filed: Mar. 5, 2021

(65) Prior Publication Data
US 2022/0290066 A1 Sep. 15, 2022

(51) Int. Cl.
*C10M 107/38* (2006.01)
*C08G 65/26* (2006.01)
(Continued)

(52) U.S. Cl.
CPC ....... *C10M 107/38* (2013.01); *C08G 65/2609* (2013.01); *G11B 5/012* (2013.01); *G11B 5/255* (2013.01); *G11B 5/4826* (2013.01); *G11B 5/7257* (2020.08); *G11B 21/08* (2013.01); *C10M 2213/043* (2013.01); *C10N 2020/04* (2013.01);
(Continued)

(58) Field of Classification Search
CPC .............. C10M 107/38; C10M 137/16; C10M 105/74; C10M 2213/04; C10M 2213/043; C10M 2223/08; C10M 2219/00; C10M 2223/083; C10M 2229/051; C10M 2211/042; C08G 65/2612; G11B 5/7375; G11B 5/7257; G11B 2005/0021;
(Continued)

(56) References Cited

U.S. PATENT DOCUMENTS

| | | |
|---|---|---|
| 6,099,937 A | 8/2000 | Gui et al. |
| 6,731,446 B2 | 5/2004 | Ikeda et al. |

(Continued)

FOREIGN PATENT DOCUMENTS

| | | |
|---|---|---|
| EP | 3555174 A1 | 10/2019 |
| JP | 4654339 B2 | 3/2011 |

(Continued)

OTHER PUBLICATIONS

Guo et al., "A multidentate lubricant for use in hard disk drives at sub-nanometer thickness"; Journal of Applied Physics, 2012; https://aip.scitation.org/doi/10.1063/1.3677984; 8 pages.

(Continued)

*Primary Examiner* — Vishal V Vasisth
(74) *Attorney, Agent, or Firm* — Loza & Loza, LLP; Gabriel Fitch

(57) ABSTRACT

Low-profile thermally stable lubricants for data storage devices are provided based on multi-dentate molecular designs. One such lubricant comprises perfluoroalkyl ether segments, a divalent linking segment, and anchoring functional groups attachable to, or engageable with, a protective overcoat of a magnetic recording medium. The lubricants can be used in conjunction with a magnetic recording medium and/or a magnetic data storage system.

19 Claims, 12 Drawing Sheets

(51) Int. Cl.

| | | |
|---|---|---|
| *G11B 5/012* | (2006.01) | |
| *G11B 21/08* | (2006.01) | |
| *G11B 5/48* | (2006.01) | |
| *G11B 5/255* | (2006.01) | |
| *G11B 5/725* | (2006.01) | |
| *C10N 40/18* | (2006.01) | |
| *C10N 20/04* | (2006.01) | |
| *C10N 50/08* | (2006.01) | |

(52) U.S. Cl.
CPC ...... *C10N 2040/18* (2013.01); *C10N 2050/08* (2013.01)

(58) Field of Classification Search
CPC ....... G11B 5/6082; G11B 5/012; G11B 5/255; C10N 2030/06; C10N 2040/18; C10N 2020/04
See application file for complete search history.

(56) References Cited

U.S. PATENT DOCUMENTS

| | | | |
|---|---|---|---|
| 7,715,302 | B2 | 5/2010 | Ohta et al. |
| 8,178,480 | B2 | 5/2012 | Hamakubo et al. |
| 8,787,130 | B1 | 7/2014 | Yuan et al. |
| 9,117,475 | B2 | 8/2015 | Nakata et al. |
| 9,382,496 | B1 | 7/2016 | Knigge et al. |
| 9,466,322 | B2 | 10/2016 | Deng et al. |
| 9,598,657 | B2 | 3/2017 | Isobe et al. |
| 10,262,685 | B2 | 4/2019 | Pathem |
| 10,373,632 | B2 | 8/2019 | Brand et al. |
| 10,766,844 | B2 | 9/2020 | Valsecchi et al. |
| 10,899,883 | B2 | 1/2021 | Galimberti et al. |
| 10,947,476 | B2 | 3/2021 | Lu et al. |
| 2003/0176629 | A1 | 9/2003 | Blomquist et al. |
| 2003/0181633 | A1 | 9/2003 | Blomquist et al. |
| 2007/0060487 | A1 | 3/2007 | Burns et al. |
| 2010/0035083 | A1 | 2/2010 | Yang et al. |
| 2011/0117386 | A1 | 5/2011 | Li et al. |
| 2012/0097194 | A1 | 4/2012 | Mcdaniel et al. |
| 2012/0219826 | A1 | 8/2012 | Li et al. |
| 2012/0251843 | A1 | 10/2012 | Yan et al. |
| 2014/0234666 | A1 | 8/2014 | Knigge et al. |
| 2015/0235664 | A1 | 8/2015 | Deng et al. |
| 2015/0361212 | A1 | 12/2015 | Takahashi et al. |
| 2016/0260452 | A1 | 9/2016 | Pathem |
| 2016/0329074 | A1* | 11/2016 | Karis ............ G11B 5/8408 |
| 2017/0260472 | A1 | 9/2017 | Sagata et al. |
| 2018/0268853 | A1 | 9/2018 | Shimokawa et al. |
| 2019/0352573 | A1 | 11/2019 | Hatta et al. |

FOREIGN PATENT DOCUMENTS

| | | |
|---|---|---|
| KR | 20100067037 A | 6/2010 |
| WO | 2015/182321 A1 | 12/2015 |
| WO | 2017/099075 A1 | 6/2017 |
| WO | 2018159232 A1 | 9/2018 |
| WO | 2021002178 A1 | 1/2021 |

OTHER PUBLICATIONS

Guo et al., "Multidentate functionalized lubricant for ultralow head/disk spacing in a disk drive"; Journal of Applied Physics; 2006; https://www.researchgate.net/publication/252269467_Multidentate_functionalized_lubricant_for_ultralow_headdisk_spacing_in_a_disk_drive; 9 pages.

Marchon et al., "Fomblin Multidentate Lubricants for Ultra-Low Magnetic Spacing"; IEEE Transactions on Magnetics; vol. 42, No. 10; Oct. 2006; https://ieeexplore.ieee.org/document/1704346; 4 pages.

Marchon, Bruno, "Lubricant Design Attributes for Subnanometer Head-Disk Clearance"; IEEE Transactions on Magnetics; vol. 45, No. 2; Feb. 2009; https://ieeexplore.ieee.org/document/4782079?reload=true; 6 pages.

Rhew et al., "Thermal Stability of Modified Perfluoropolyether Lubricants for Application in Heat Assisted Magnetic Recording"; Proceedings of the ASME/STLE 2011 International Joint Tribology Conference; 2011; https://doi.org/10.1115/IJTC2011-61044; 2 pages.

Jones et al., "Laser-Induced Thermo-Desorption of Perfluoropolyether Lubricant from the Surface of a Heat-Assisted Magnetic Recording Disk: Lubricant Evaporation and Diffusion"; ResearchGate; Jul. 1, 2015; https://www.researchgate.net/publication/281528079_Laser-Induced_Thermo-Desorption_of_Perfluoropolyether_Lubricant_from_the_Surface_of_a_Heat-Assisted_Magnetic_Recording_Disk_Lubricant_Evaporation_and_Diffusion; 7 pages.

Wu, Lin, "Modelling and simulation of the lubricant depletion process induced by laser heating in heat-assisted magnetic recording system"; IOP Publishing: Nanotechnology; vol. 18, No. 21; Apr. 27, 2007; https://iopscience.iop.org/article/10.1088/0957-4484/18/21/215702/pdf; 9 pages.

Zhang et al., "Lubrication for Heat-Assisted Magnetic Recording Media"; IEEE Transactions on Magnetics; vol. 42, Issue 10, Oct. 2006; https://ieeexplore.ieee.org/document/1704360; 3 pages.

International Search Report and Written Opinion for International Application No. PCT/US2021/041499, dated Sep. 9, 2021, 13 pages.

International Search Report and Written Opinion for International Application No. PCT/US2021/041500, dated Sep. 14, 2021, 15 pages.

Brunner, Ralf, "Properties of Carbon Overcoats and Perfluoro-Polyether Lubricants in Hard Disk Drives"; Ph.D Dissertation; University of California, San Diego; 2009; https://escholarship.org/uc/item/24w0q2v0; 248 pages.

* cited by examiner

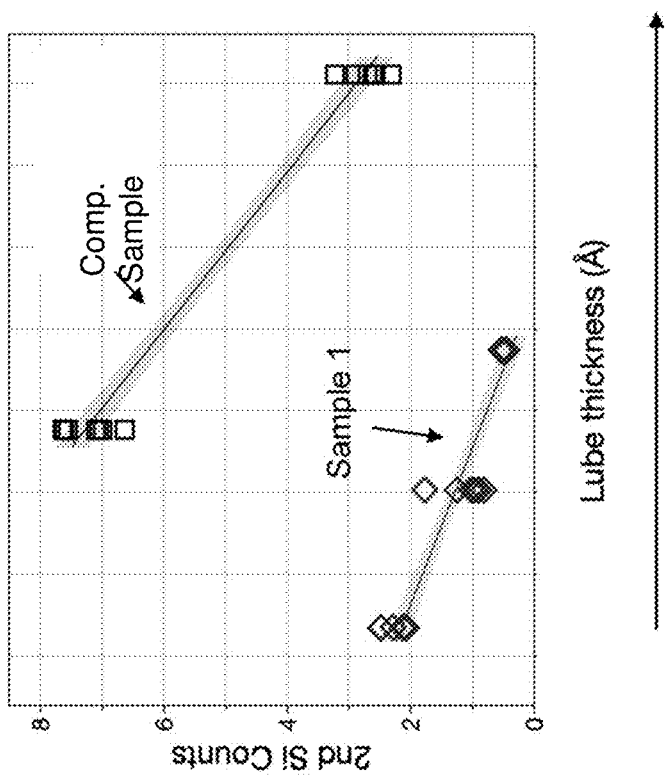

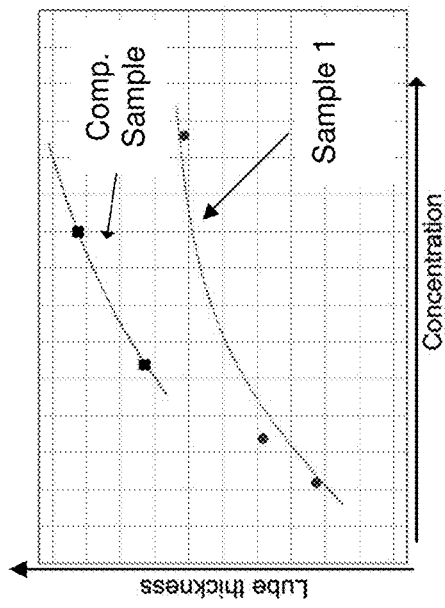
FIG. 9A
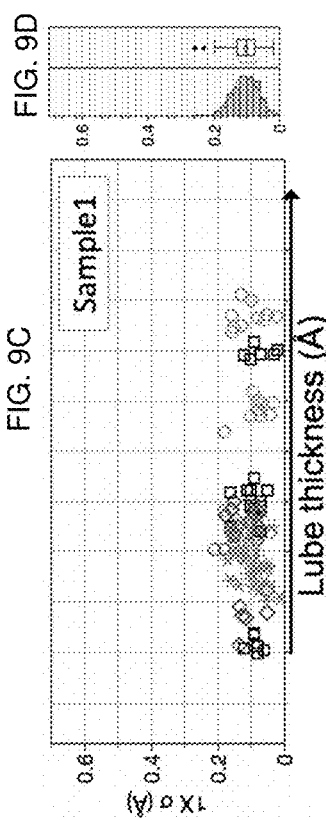
FIG. 9C
FIG. 9D
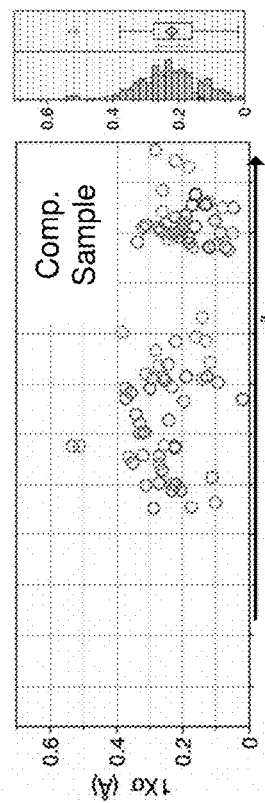
FIG. 9F
FIG. 9G
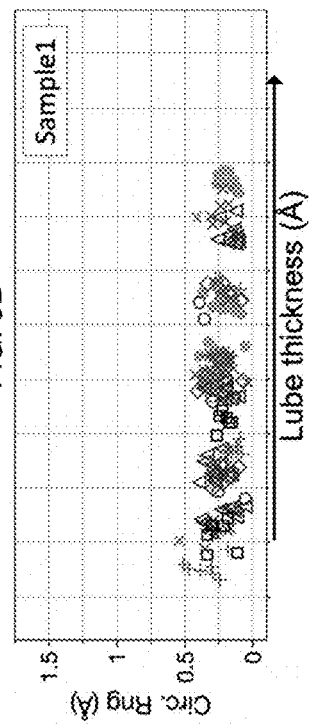
FIG. 9B
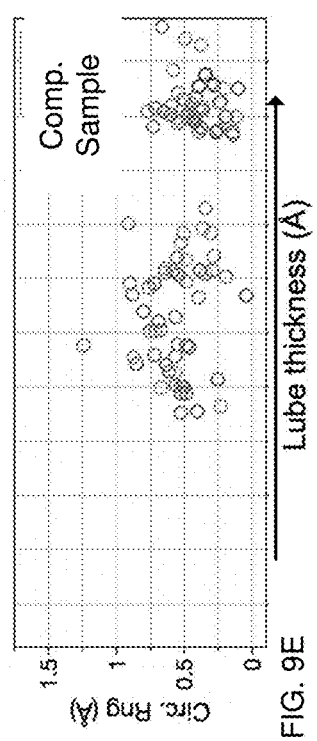
FIG. 9E

LOW PROFILE LUBRICANTS FOR DATA STORAGE DEVICES

FIELD

The disclosure relates to lubricants, and more particularly, to low profile lubricants, which may be used with data storage devices configured for magnetic recording.

INTRODUCTION

Data storage systems using magnetic recording, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high-definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks generally include two main components, namely, a substrate material that gives it structure and rigidity, and a magnetic media coating that stores the magnetic signals that represent data in a recording layer within the coating. The typical disk drive also includes a read head and a write head, generally in the form of a magnetic transducer (e.g., the "head") which can sense and/or change the magnetic fields stored on the recording layer of the disks. Operation of the head at sub-nanometer distances from the recording layer improves performance of the disk drive. Heat Assisted Magnetic Recording (HAMR) is a recording technique that can increase the areal density capability (ADC) of written data on a magnetic storage medium having high coercivity with high-temperature assistance. However, operation of the head at sub-nanometer distances from the media alone, or in combination with the high recording temperatures applied to the media via HAMR may present challenges. Other examples of magnetic storage media include flexible tape media usable for magnetic tape recording.

As a result of the high temperatures associated with HAMR technology, suitable lubricants for use in HAMR medias may benefit from their high thermal stability. In addition, the higher temperatures also increase the presence of contaminants which may negatively affect data storage. As such, there is a need in the art for high temperature lubricants having properties suitable for use in HAMR drives, including the ability to sequester and/or remove contaminants prior to the contaminants interfering with data storage or other operational processes.

SUMMARY

In one aspect, this disclosure provides a lubricant comprising a plurality of segments according to general formula (I):

$$Re^1-Rb^1-Rc-Rb^2-Re^2 \quad (I);$$

wherein Rc is a divalent linking segment comprising general formula (II) or (IIa):

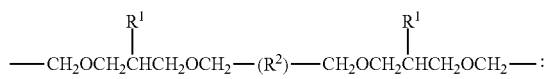
(II)

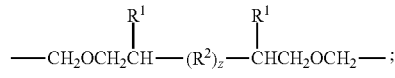
(IIa)

wherein $R^2$ comprises one or more of general formulas (i) through (vi):

(i)

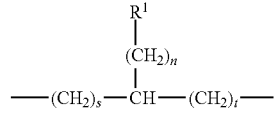
(ii)

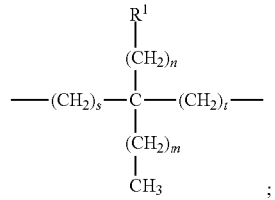
(iii)

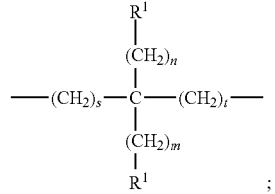
(iv)

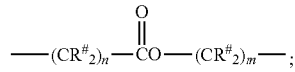
(v)

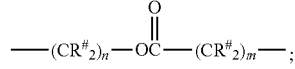
(vi)

or a combination thereof;
wherein p, when present, is from 1 to 20;
wherein s, when present, is from 0 to 10;
wherein t, when present, is from 0 to 10;
wherein n, when present, is from 1 to 10;
wherein m, when present, is from 0 to 10;
wherein z, when present, is from 1 to 10;
wherein each $R^\#$, when present, is independently, H or F;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

In one aspect, this disclosure provides a magnetic recording medium comprising a magnetic recording layer on a substrate; a protective overcoat on the magnetic recording layer; and a lubricant layer on the protective overcoat, the lubricant comprising a plurality of segments according to general formula (I):

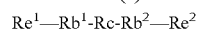

wherein Rc is a divalent linking segment comprising general formula (II) or (IIa):

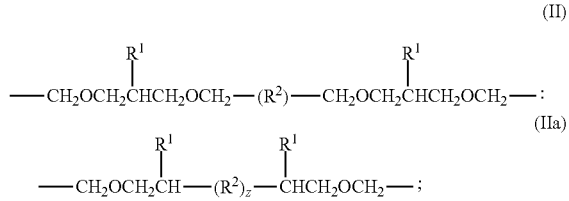

wherein $R^2$ comprises one or more of general formulas (i) through (vi):

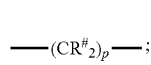

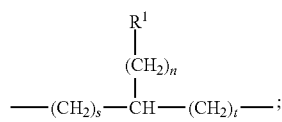

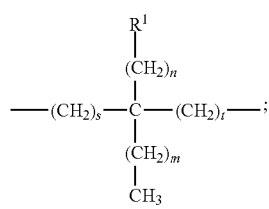

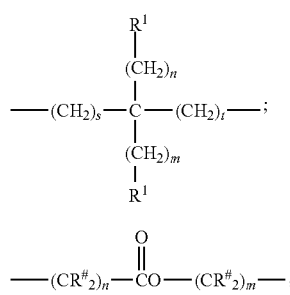

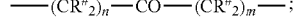

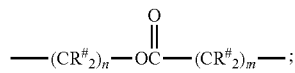

or a combination thereof;
wherein p, when present, is from 1 to 20;
wherein s, when present, is from 0 to 10;
wherein t, when present, is from 0 to 10;
wherein n, when present, is from 1 to 10;
wherein m, when present, is from 0 to 10;
wherein z, when present, is from 1 to 10;
wherein each $R^\#$, when present, is independently, H or F;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

In one aspect, this disclosure also provides a data storage system comprising a magnetic head; a magnetic recording medium according to any one or more aspects disclosed herein, a drive mechanism for positioning the magnetic head over the magnetic recording medium; and a controller electrically coupled to the magnetic head for controlling operation of the magnetic head.

Other aspects according to the disclosure herein include the following:

A1. A lubricant comprising: a plurality of segments according to general formula (I):

wherein Rc is a divalent linking segment comprising general formula (II) or (IIa):

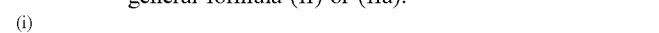

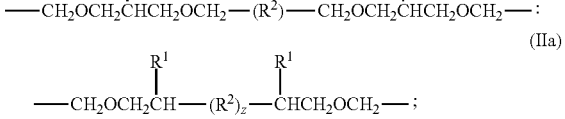

wherein $R^2$ comprises general formula (i):

wherein p is from 1 to 20, or from 4 to 20, or from 6 to 10; and
wherein z, when present, is from 1 to 10;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

A2. A lubricant comprising: a plurality of segments according to general formula (I):

wherein Rc is a divalent linking segment comprising general formula (II) or (IIa):

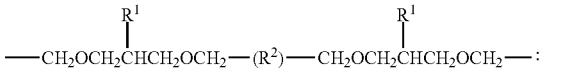

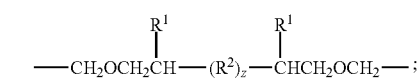

wherein $R^2$ comprises general formula (ii):

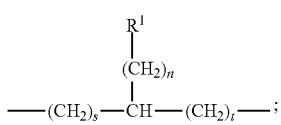
(ii)

wherein s is from 0 to 10;
wherein t is from 0 to 10;
wherein n is from 1 to 10;
wherein z, when present, is from 1 to 10; wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

A3. A lubricant comprising: a plurality of segments according to general formula (I):

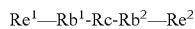
(I);

wherein Rc is a divalent linking segment comprising general formula (II) or (IIa):

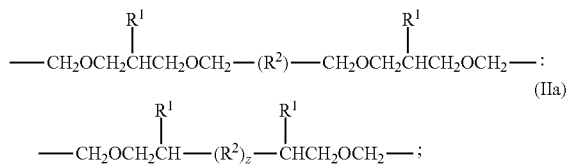
(II)
(IIa)

wherein $R^2$ comprises general formula (iii):

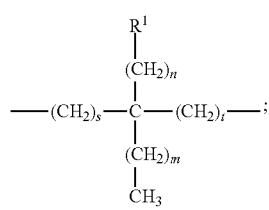
(iii)

wherein s is from 0 to 10;
wherein t, when present, is from 0 to 10;
wherein n is from 1 to 10;
wherein m is from 0 to 10;
wherein z, when present, is from 1 to 10; wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

A4. A lubricant comprising: a plurality of segments according to general formula (I):

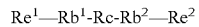
(I);

wherein Rc is a divalent linking segment comprising general formula (II) or (IIa):

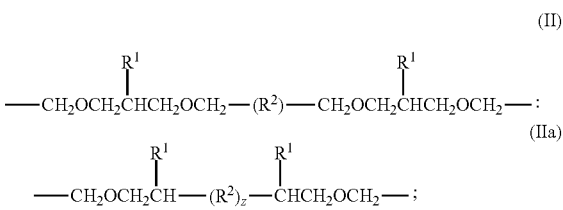
(II)
(IIa)

wherein $R^2$ comprises general formula (iv):

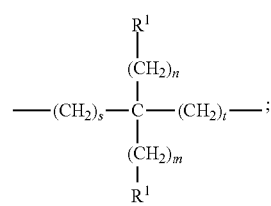
(iv)

wherein s is from 0 to 10;
wherein t is from 0 to 10;
wherein n is from 1 to 10;
wherein m is from 0 to 10;
wherein z, when present, is from 1 to 10;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

A5. A lubricant comprising: a plurality of segments according to general formula (I):

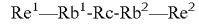
(I);

wherein Rc is a divalent linking segment comprising general formula (II) or (IIa):

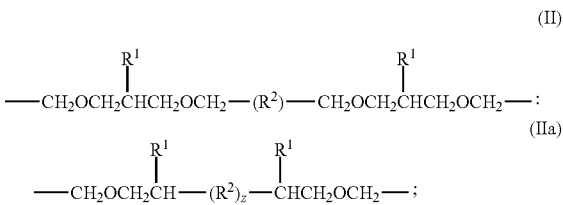
(II)
(IIa)

wherein $R^2$ comprises general formula (v):

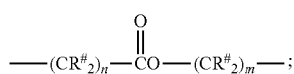
(v)

wherein n is from 1 to 10;
wherein m is from 0 to 10;
wherein z, when present, is from 1 to 10;
wherein each $R^\#$is, independently, H or F;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

A6. A lubricant comprising: a plurality of segments according to general formula (I):

$Re^1$—$Rb^1$-Rc-$Rb^2$—$Re^2$ (I);

wherein Rc is a divalent linking segment comprising general formula (II) or (IIa):

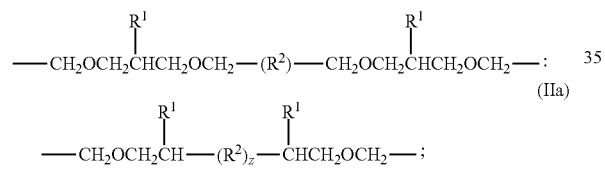

wherein $R^2$ comprises general formula (vi):

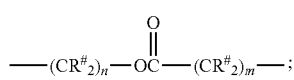
(vi)

wherein n is from 1 to 10;
wherein m is from 0 to 10;
wherein z, when present, is from 1 to 10;
wherein each $R^\#$is, independently, H or F;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

A7. A lubricant comprising: a plurality of segments according to general formula (I):

$Re^1$—$Rb^1$-Rc-$Rb^2$—$Re^2$ (I);

wherein Rc is a divalent linking segment comprising general formula (II) or (IIa):

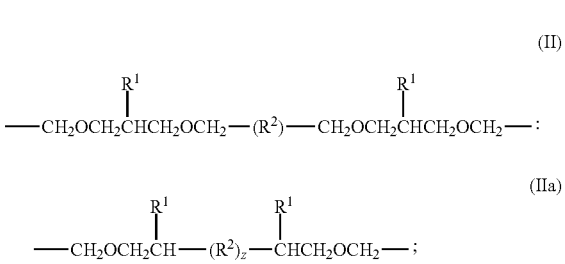

wherein $R^2$ comprises one or more of general formulas (i) through (vi):

(i)

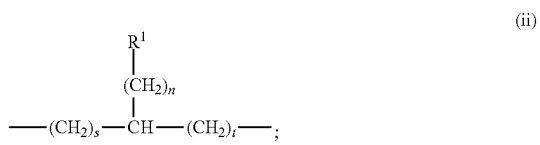
(ii)

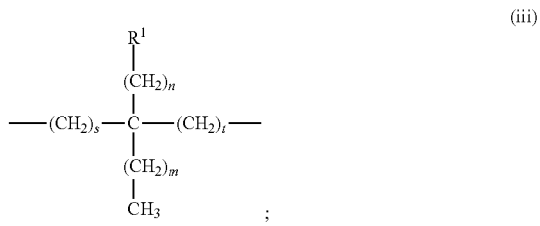
(iii)

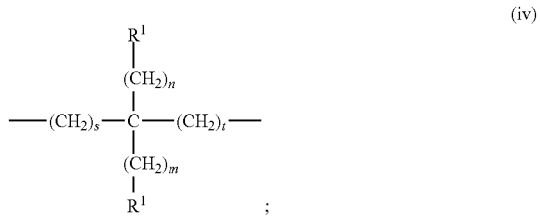
(iv)

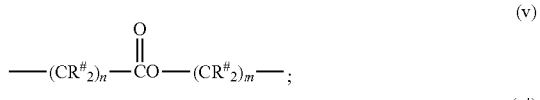
(v)

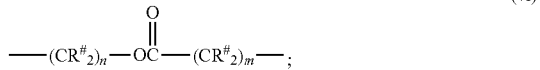
(vi)

or a combination thereof;
wherein p, when present, is from 1 to 20;
wherein s, when present, is from 0 to 10;
wherein t, when present, is from 0 to 10;
wherein n, when present, is from 1 to 10;
wherein m, when present, is from 0 to 10;
wherein z, when present, is from 1 to 10;
wherein each $R^\#$, when present, is independently, H or F;
wherein each $R^1$ is an anchoring functional group engageable with a protective overcoat of a magnetic recording media;

wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and wherein each of $Re^1$ and $Re^2$ independently comprises an anchoring functional group engageable with the protective overcoat of the magnetic recording media.

A8. The lubricant according to any one of aspects A1 through A7, wherein each anchoring functional group comprises at least one of: B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

A9. The lubricant according to any one of aspects A1 through A8, wherein each anchoring functional group comprises a hydroxyl moiety (—OH).

A10. The lubricant according to any one of aspects A1 through A9, wherein each $R^1$ is a hydroxyl moiety (—OH).

A10.1 The lubricant according to any one of aspects A1 through A10, wherein $R^2$ further comprises one or more of general formulas (ia) through (va):

—CF$_2$CF$_2$CF$_2$O(CF$_2$CF$_2$CF$_2$CF$_2$O)$_a$CF$_2$CF$_2$CF$_2$—; (ia)

—CF$_2$CF$_2$O(CF$_2$CF$_2$CF$_2$O)$_a$CF$_2$CF$_2$—; (iia)

—CF$_2$CF$_2$O[CF(CF$_3$)CF$_2$O]$_a$CF$_2$CF$_2$—; (iiia)

—CF$_2$O(CF$_2$CF$_2$O)$_a$(CF$_2$O)$_b$CF$_2$—; (iva)

—CF$_2$O(CF$_2$CF$_2$O)$_a$CF$_2$—; (va)

or a combination thereof;

wherein each a is, independently from 1 to 20, and wherein each b, when present, is independently from 1 to 20.

A11. The lubricant according to any one of aspects A1 through A10, wherein Rc comprises general formula (IIb):

wherein $R^2$ comprises one or more of formulas (ii) through (vi):

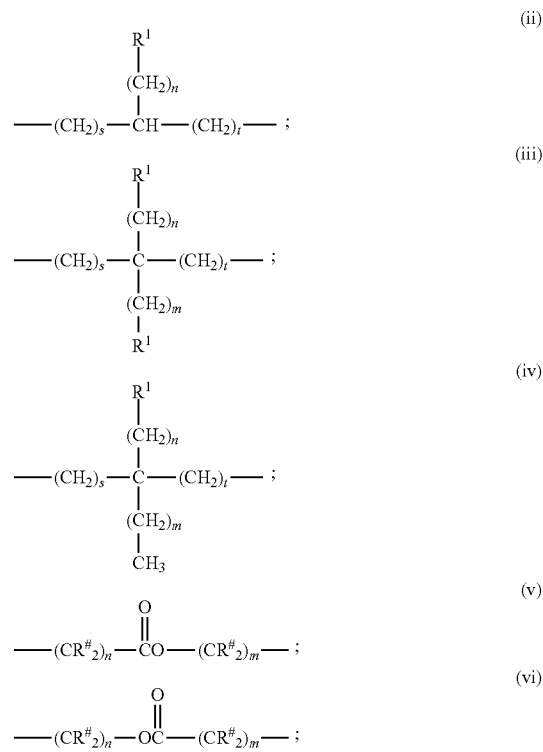

or a combination thereof;

wherein s, when present, is from 0 to 10;

wherein t, when present, is from 0 to 10;

wherein n is from 1 to 10;

wherein m, when present, is from 0 to 10;

wherein each $R^\#$, when present, is independently, H or F;

wherein each $R^1$ comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

A12. The lubricant according to any one of aspects A1 through A10, wherein Rc comprises general formula (IIb):

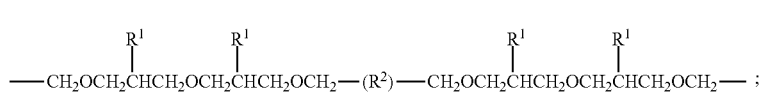

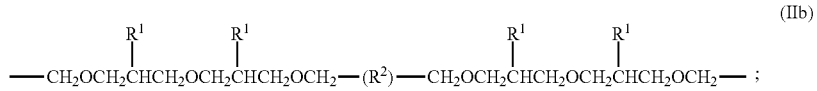

wherein $R^2$ comprises formula (ii):

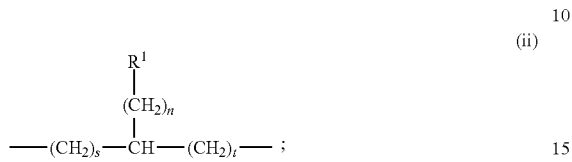

wherein s is from 0 to 10;
wherein t is from 0 to 10;
wherein n is from 1 to 10;
wherein each $R^1$ comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A13. The lubricant according to any one of aspects A1 through A10, wherein Rc comprises general formula (IIb):

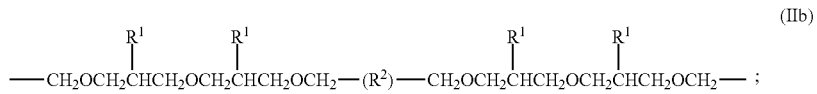

wherein $R^2$ comprises formula (iii):

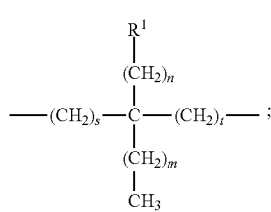

wherein s is from 0 to 10;
wherein t is from 0 to 10;
wherein n is from 1 to 10;
wherein m is from 0 to 10;

wherein each $R^1$ comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A14. The lubricant according to any one of aspects A1 through A10, wherein Rc comprises general formula (IIb):

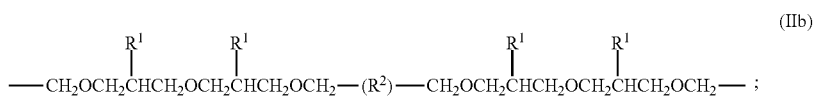

wherein R² comprises formula (iv):

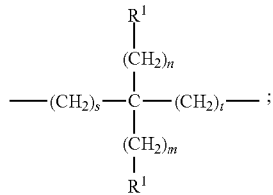

wherein s is from 0 to 10;
wherein t is from 0 to 10;
wherein n is from 1 to 10;
wherein m is from 0 to 10;

wherein each R¹ comprises at least one of B, Si, a pnictogen, a chalcogen, a halogen, —OR*, —NR*₂, —NR*—CO—R*, —O—CO—R*, —CO—O—R*, —SeR*, —TeR*, —PR*₂, —PO—(OR*)₂, —O—PO—(OR*)₂, —N=P(NR*₂)₃, —AsR*₂, —SR*, —SO₂—(OR*)₂, —BR*₂, —SiR*₃, —(CH₂)$_q$—SiR*₃, —(CF₂)$_q$—SiR*₃, or a combination thereof, wherein q is 1 to 10 and each R* is, independently, a hydrogen, B, Si, a pnictogen, a chalcogen, a halogen, a saturated C₁-C₅₀ radical, an unsaturated C₂-C₅₀ radical, an aromatic C₄-C₅₀ radical, a polycyclic aromatic C₅-C₅₀ radical, a heteroaromatic C₅-C₅₀ radical, an alicyclic C₃-C₅₀ radical, and/or a heterocyclic C₂-C₅₀ radical, and wherein two or more R* may join together to form a ring structure.

A15. The lubricant according to any one of aspects A1 through A10, wherein Rc comprises general formula (IIb):

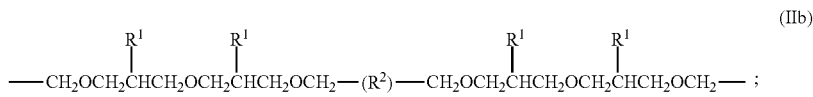

wherein R² comprises formula (v):

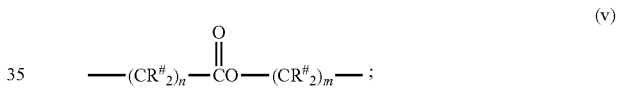

wherein n is from 1 to 10;
wherein m is from 0 to 10;
wherein each R#is, independently, H or F;
wherein each R¹ comprises at least one of B, Si, a pnictogen, a chalcogen, a halogen, —OR*, —NR*₂, —NR*—CO—R*, —O—CO—R*, —CO—O—R*, —SeR*, —TeR*, —PR*₂, —PO—(OR*)₂, —O—PO—(OR*)₂, —N=P(NR*₂)₃, —AsR*₂, —SR*, —SO₂—(OR*)₂, —BR*₂, —SiR*₃, —(CH₂)$_q$—SiR*₃, —(CF₂)$_q$—SiR*₃, or a combination thereof, wherein q is 1 to 10 and each R* is, independently, a hydrogen, B, Si, a pnictogen, a chalcogen, a halogen, a saturated C₁-C₅₀ radical, an unsaturated C₂-C₅₀ radical, an aromatic C₄-C₅₀ radical, a polycyclic aromatic C₅-C₅₀ radical, a heteroaromatic C₅-C₅₀ radical, an alicyclic C₃-C₅₀ radical, and/or a heterocyclic C₂-C₅₀ radical, and wherein two or more R* may join together to form a ring structure.

A16. The lubricant according to any one of aspects A1 through A10, wherein Rc comprises general formula IIb:

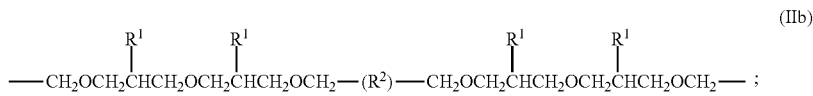

wherein $R^2$ comprises formula (vi):

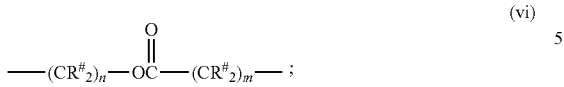
(vi)

wherein n is from 1 to 10;
wherein m is from 0 to 10;
wherein each $R^\#$ is, independently, H or F;
wherein each $R^1$ comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A17. The lubricant according to any one of aspects A11 through A16, wherein each anchoring functional group comprises a hydroxyl moiety (—OH).

A18. The lubricant according to any one of aspects A11 through A17, wherein each anchoring functional group is a hydroxyl moiety (—OH).

A18.1 The lubricant according to any one of aspects A11 through A18, wherein $R^2$ further comprises one or more of general formulas (ia) through (va):

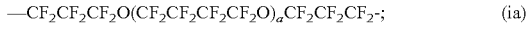 (ia)

 (iia)

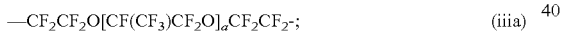 (iiia)

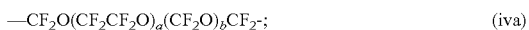 (iva)

 (va)

or a combination thereof;
wherein each a is, independently from 1 to 20, and
wherein each b, when present, is independently from 1 to 20.

A19. The lubricant according to any one of aspects A1 through A18.1, wherein each of $Rb^1$ and $Rb^2$ independently comprises one or more of general formulas (ia) through (va):

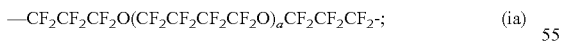 (ia)

 (iia)

 (iiia)

 (iva)

 (va)

or a combination thereof,
wherein each a is, independently from 1 to 20, and
wherein each b, when present, is independently from 1 to 20.

A20. The lubricant according to any one of aspects A1 through A18.1, wherein each of $Rb^1$ and $Rb^2$ independently comprises formula (ia):

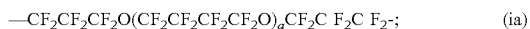 (ia)

wherein each a is, independently from 1 to 20.

A21. The lubricant according to any one of aspects A1 through A18.1, wherein each of $Rb^1$ and $Rb^2$ independently comprises formula (iia):

 (iia)

wherein each a is, independently from 1 to 20.

A22. The lubricant according to any one of aspects A1 through A18.1, wherein each of $Rb^1$ and $Rb^2$ independently comprises formula (iiia):

 (iiia)

wherein each a is, independently from 1 to 20.

A23. The lubricant according to any one of aspects A1 through A18.1, wherein each of $Rb^1$ and $Rb^2$ independently comprises formula (iva):

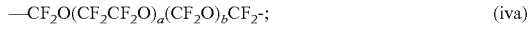 (iva)

wherein each a is, independently from 1 to 20, and
wherein each b, when present, is independently from 1 to 20.

A24. The lubricant according to any one of aspects A1 through A18.1, wherein each of $Rb^1$ and $Rb^2$ independently comprises formula (va):

 (va)

wherein each a is, independently from 1 to 20.

A25. The lubricant according to any one of aspects A1 through A24, wherein each of $Re^1$ and $Re^2$ independently comprises general formula (III):

(III)

wherein each $R^1$ is an anchoring functional group engageable with a protective overcoat of a magnetic recording media comprising at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A26. The lubricant according to any one of aspects A1 through A25, wherein each anchoring functional group comprises a hydroxyl moiety (—OH).

A27. The lubricant according to any one of aspects A1 through A26, wherein each anchoring functional group is a hydroxyl moiety (—OH).

A28. A lubricant comprising general formula (IV):

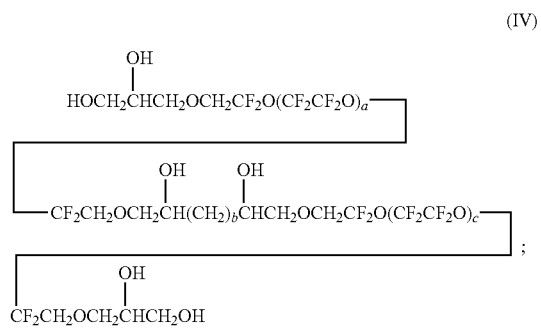

wherein a is from 1 to 20; b is from 1 to 10; and c is from 1 to 20.

A29. A lubricant comprising general formula (V):

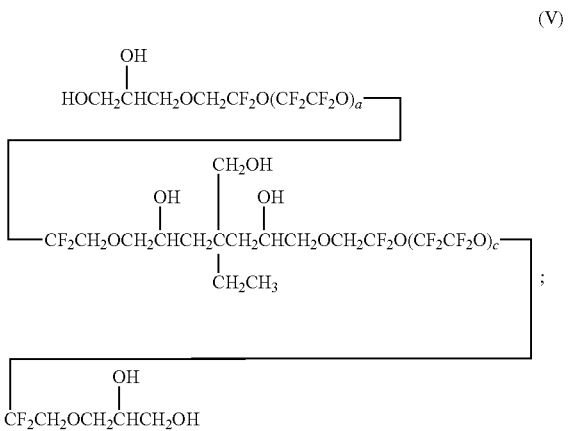

wherein a is from 1 to 20; and c is from 1 to 20.

A30. A lubricant comprising general formula (VI):

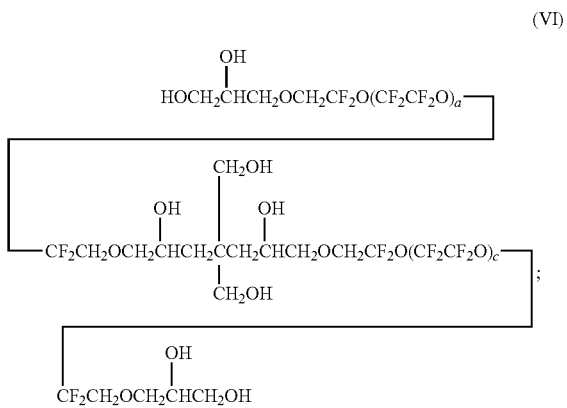

wherein a is from 1 to 20; and c is from 1 to 20.

A31. The lubricant according to any one of aspects A1 through A30, comprising a weight average molecular weight from about 0.5 to 20 kiloDaltons (kDa).

A32. The lubricant according to any one of aspects A1 through A31, comprising a polydispersity of greater than or equal to about 1 and less than or equal to about 2.

A33. The lubricant according to any one of aspects A1 through A32, comprising a dewetting thickness of less than or equal to about 10 nanometers.

A34. The lubricant according to any one of aspects A1 through A33, comprising a dewetting thickness of less than or equal to about 1 nanometers.

A35. A magnetic recording medium, comprising:
a magnetic recording layer on a substrate;
a protective overcoat on the magnetic recording layer; and
a lubricant layer comprising the lubricant according to any one of aspects A1 through A34 on the protective overcoat.

A36. The magnetic recording medium according to aspect A35, wherein the lubricant has a bonding percentage of about 10% to less than 100%, corresponding to a degree of bonding of the lubricant to the total area of an upper surface of the protective overcoat.

A37. The magnetic recording medium according to aspect A35 or A36, wherein the lubricant comprises a dewetting thickness of less than or equal to about 10 nanometers.

A38. A data storage system, comprising:
at least one magnetic head;
a magnetic recording medium according to any one of aspects A35 through A37;
a drive mechanism for positioning the at least one magnetic head over the magnetic recording medium; and
a controller electrically coupled to the at least one magnetic head for controlling operation of the at least one magnetic head.

A39. A data storage system, comprising:
a slider comprising at least one magnetic head and an air bearing surface (ABS), wherein a lubricant according to any one of aspects A1 through A34 is disposed on the ABS; and
a magnetic recording medium comprising a magnetic recording layer;
wherein the slider is configured to write information to the magnetic recording layer A40. The data storage system according to aspect A39, wherein the slider is configured to write information to the magnetic recording layer using conventional magnetic recording (CMR), heat assisted magnetic recording (HAMR), or a combination thereof.

Other aspects and advantages of the present disclosure will become apparent from the following detailed description and examples, when considered in conjunction with the drawings.

BRIEF DESCRIPTION OF THE DRAWINGS

FIG. 6A is a graph showing contamination robustness in the form of time-of-flight secondary ion mass spectrometry (TOF-SIMS) Si counts versus the thickness of a lubricant utilizing a representative group of Si ions according to aspects of the disclosure;

FIG. 6B is a graph showing contamination robustness in the form of TOF-SIMS Si counts versus the thickness of a lubricant utilizing another representative group of Si ions according to aspects of the disclosure;

FIG. 9A is a graph showing the processability of a lubricant according to cone aspect of the disclosure indicated by lube thickness versus lube bath concentration;

FIG. 9B is a graph showing the processability of a lubricant according to one aspect of the disclosure indicated by circumferential lube thickness ranges versus lube thickness for the selected lubricant sample 1;

FIG. 9C is a graph showing the processability of a lubricant according to one aspect of the disclosure indicated by lube thickness standard deviation of the selected lubricant sample 1 versus its lube thickness;

FIG. 9D is a statistical summary of the data shown in FIG. 9C;

FIG. 9E is a graph showing the circumferential lube thickness ranges versus lube thickness for the comparative sample;

FIG. 9F is a graph showing lube thickness standard deviation of the comparative sample versus its lube thickness;

FIG. 9G is a statistical summary of the data shown in FIG. 9F;

DETAILED DESCRIPTION

Figure 1A:
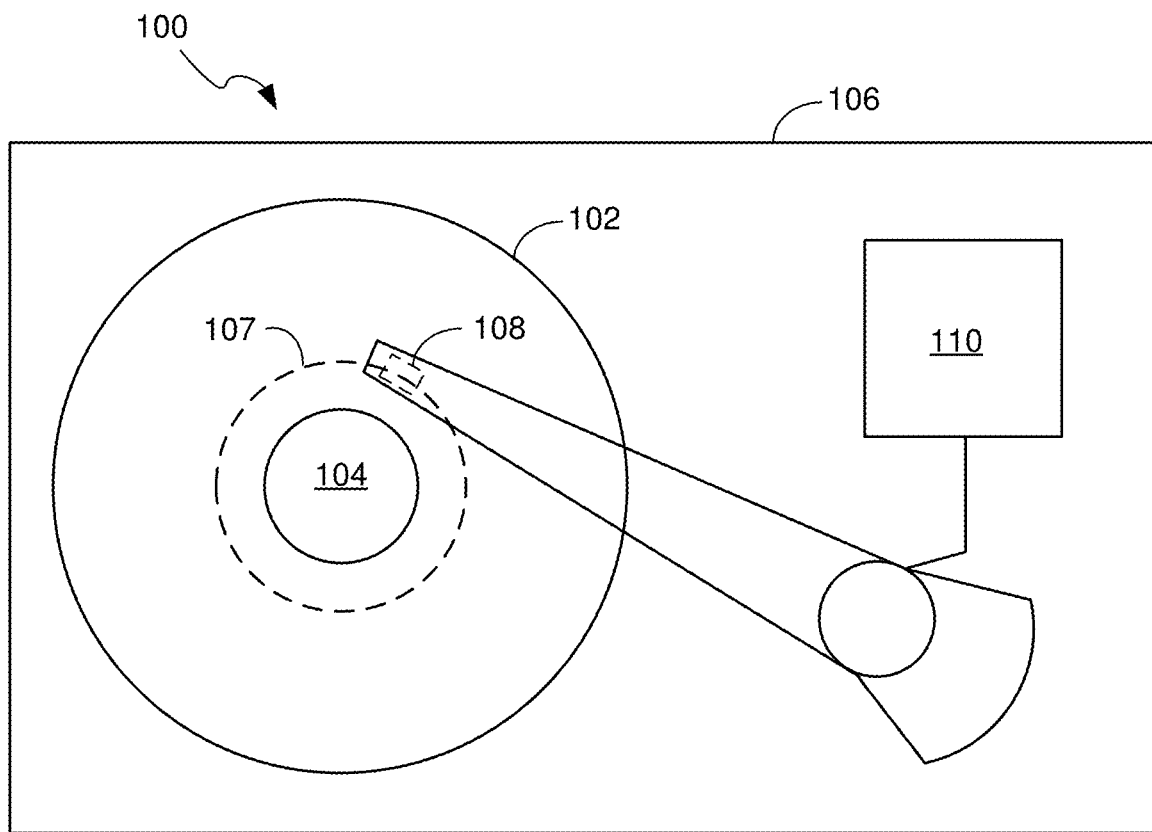
FIG. 1A is a diagram schematically illustrating a data storage device comprising a slider and a magnetic recording medium in accordance with one aspect of the disclosure.

Heat Assisted Magnetic Recording (HAMR) systems operate at substantially higher temperatures than traditional magnetic recording systems, also referred to herein as conventional magnetic recording (CMR) systems which do not employ heat or other energy assisted recording. Examples of CMR systems may include perpendicular magnetic recording disk drives and flexible tape media usable for magnetic tape recording, which do not employ heat or other energy assisted recording. HAMR is an example of magnetic recording within the class of Energy Assisted Magnetic Recording (EAMR) techniques, where conventional magnetic recording (CMR) is supplemented by other energy used in the system. Other examples of EAMR may include Microwave Assisted Magnetic Recording (MAMR) and applications of electric current into various conductive and/or magnetic structures near the main pole. This disclosure is generally directed to lubricants having a relatively low profile along with high thermal stability that can be used in conjunction with a magnetic recording medium and/or within a magnetic data storage system using HAMR, or more generally EAMR. In one aspect, one such lubricant may comprise general formula (I):

$$Re^1\text{—}Rb^1\text{-}Rc\text{-}Rb^2\text{—}Re^2 \qquad (I);$$

wherein Rc is a divalent linking segment which may comprise general formula (II) or (IL):

(II)

(IIa)

wherein $R^2$ may comprise one or more of general formulas (i) through (vi):

(i)

(ii)

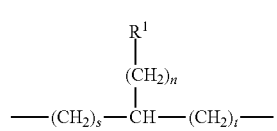

-continued

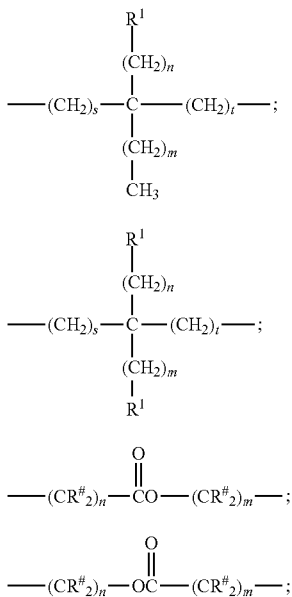

or a combination thereof;
wherein p, when present, is from 1 to 20;
wherein s, when present, is from 0 to 10;
wherein t, when present, is from 0 to 10;
wherein n, when present, is from 1 to 10;
wherein m, when present, is from 0 to 10;
wherein z, when present, is from 1 to 10;
wherein each $R^{\#}$, when present, is independently, H or F;
wherein each $R^1$ is an anchoring functional group engageable with a protective overcoat of a magnetic recording media;
wherein each of $Rb^1$ and $Rb^2$ may independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ may independently comprise an anchoring functional group engageable with a protective overcoat of a magnetic recording media.

The polydentate structure of the lubricant provides a lubricant layer having a relatively low profile, e.g., a thickness of less than about 10 nm, or less than about 5 nm, or less than about 3 nm, or less than about 2 nm, or less than about 1 nm, or less about 0.9 nm, along with acceptable levels of head wear, reduced lube pickup, and other properties. In addition, in some aspects the divalent linking segment facilitates better attachment/higher coverage of the lubricant with the protective overcoat of a magnetic recording media, which is also referred to herein as the engagement of the lubricant with the protective overcoat of a magnetic recording media, which further improves the contamination robustness and heat stability when compared with lubricants known in the art.

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g. Hf, Ti, or Zr.

As used herein, and unless otherwise specified, the term "$C_n$," means hydrocarbon(s) having n carbon atom(s) per molecule, where n is a positive integer. Likewise, a "$C_m$-$C_y$," group or compound refers to a group or compound comprising carbon atoms at a total number thereof in the range from m to y. Thus, a $C_1$-$C_4$ alkyl group refers to an alkyl group that comprises carbon atoms at a total number thereof in the range of 1 to 4, e.g., 1, 2, 3 and 4.

"Moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{50}$ radicals that may be linear, branched, or cyclic, and when cyclic, aromatic or non-aromatic. Examples of such radicals comprise, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a heteroatom is any non-carbon atom, selected from groups 13 through 17 of the periodic table of the elements. In one or more aspects, heteroatoms are non-metallic atoms selected from B, N, O, Si, P, S, As Se, Te and the halogens F, Cl, Br, I, and At.

Unless otherwise indicated, the term "substituted" means that at least one hydrogen atom has been replaced with at least one non-hydrogen atom or a functional group.

For purposes herein, when a segment comprises or includes a particular moiety, it is to be understood that the moiety may be bonded to the respective segment at any substitutable position in which a hydrogen atom may be replaced with a chemical bond between the moiety and the segment.

For purposes herein, a functional group comprises one or more of a hydrocarbyl group, a heteroatom, or a heteroatom containing group, such as B, Si, pnictogen, chalcogen, or halogen (such as Br, Cl, F or I), at least one of —OR*, —NR*$_2$, —NR*—CO—R*, *—O—CO—R*, —CO—O—R*, —SeR*, —TeR*, —PR*$_2$, —PO—(OR*)$_2$, —O—PO—(OR*)$_2$, —AsR*$_2$, —SbR*$_2$, —SR*, —SO$_2$—(OR*)$_2$, —BR*$_2$, —SiR*$_3$, —(CH$_2$)$_q$—SiR*$_3$, or a combination thereof, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

In one or more aspects, functional groups may comprise B, Si, a pnictogen, a chalcogen, a saturated $C_1$-$C_{50}$ radical, an unsaturated $C_1$-$C_{50}$ radical, an alicyclic $C_3$-$C_{50}$ radical, and/or a heterocyclic $C_3$-$C_{50}$ radical, an aromatic $C_5$-$C_{50}$ radical, a heteroaromatic $C_5$-$C_{50}$ radical, a cyclotriphosphazine radical, a halogen, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, a heterocyclic $C_2$-$C_{50}$ radical, and wherein two or more R* may join together to form a ring structure.

For purposes as described herein, an anchoring functional group is a functional group which is selected for being attachable to a protective overcoat of a magnetic recording media, or which is selected for being engageable with a protective overcoat of a magnetic recording media, and refers to a functional group having increased affinity for the protective overcoat of a magnetic recording media relative to the affinity of perfluoroalkyl ethers to that same surface. Increased affinity or engagement may include Van der Waals forces, weak London Dispersion forces, dipole-dipole forces, polar interactions, polarizability, hydrogen bonding interactions, and/or the like, and/or may include the formation of one or more types of bonds and/or dative bonds with the protective overcoat of a recording media. In one or more aspects, a functional group which is attachable to, or engageable with, a protective overcoat of a magnetic recording media refers to one or more functional groups having increased affinity for a carbon overcoat (COC) layer of the recording media (which is one implementation of one type of protective overcoat) relative to the affinity of perfluoroalkyl ethers to that same surface. In some aspects, functional groups attachable to and/or engageable with a protective overcoat of a magnetic recording media comprise radicals comprising one or more hydroxyl moieties (—OH), or consisting of a hydroxyl moiety (—OH).

A heterocyclic ring, also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of a plurality chemical elements. A "derivative" refers to a compound in which one or more of the atoms or functional groups of a precursor compound have been replaced by another atom or functional group, generally by means of a chemical reaction having one or more steps.

In aspects of the disclosure, the lubricant comprises multiple "chain segments", e.g., a plurality of segments according to general formula (I):

$$Re^1\text{—}Rb^1\text{-}Rc\text{-}Rb^2\text{—}Re^2 \qquad (I);$$

each chain segment $Rb^1$ and $Rb^2$ may also be referred to herein as a "side chain segment" when disposed on either side of the center or linking segment. A chain segment refers to a divalent chemical moiety comprising one or more fluorinated carbon atoms, which may comprise one or more of a fluoroalkyl ether moiety, a fluoroalkenyl ether moiety, a perfluoroalkyl ether moiety, a perfluoroalkenyl ether moiety, or a combination thereof, chemically bonded to one-another between an which terminate on at least one end group, also referred to herein as an end segment e.g., $Re^1$ and $Re^2$. The "end group," or "end segment" generally abbreviated Re, refers to a mono-valent radical located at an end of a chain segment comprising one or more anchoring functional group attachable to and/or engageable with a protective overcoat of a magnetic recording media.

A fluoroalkyl ether moiety, a fluoroalkenyl ether moiety, a perfluoroalkyl ether moiety, and/or a perfluoroalkenyl ether moiety refers to a branched or linear chain of $C_1$ to $C_{50}$ alkyl and/or alkenyl ethers in which one or more hydrogen atoms are substituted with fluorine. In one aspect, all or a majority of alkyl hydrogen atoms are substituted with fluorine.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, confirmational isomers, spatial isomers, and/or the like.

HAMR System for Employing Lubricant

FIG. 1A is a top schematic view of a data storage device 100 (e.g., disk drive or magnetic recording device) configured for heat assisted magnetic recording (HAMR) comprising a slider 108 and a magnetic recording medium 102 having a lubricant according to one or more aspects of the disclosure. The laser (not visible in FIG. 1A but see 114 in FIG. 1B) is positioned with a head/slider 108. Disk drive 100 may comprise one or more disks/media 102 to store data. Disk/media 102 resides on a spindle assembly 104 that is mounted to a drive housing. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 1B:
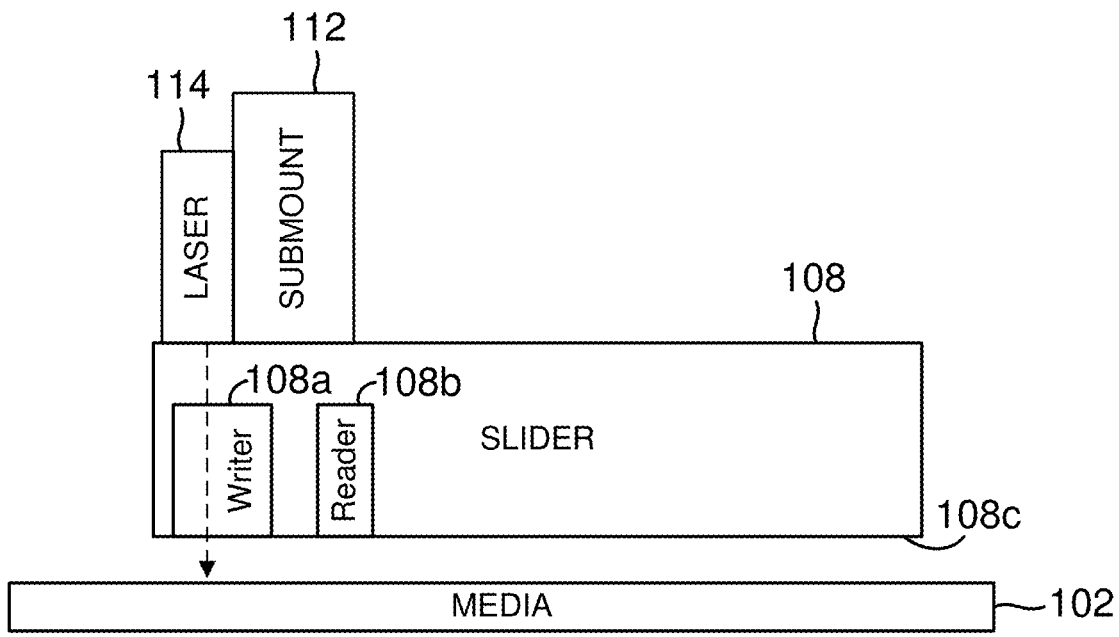
FIG. 1B is a side schematic view of the slider and magnetic recording medium of FIG. 1A in accordance with one aspect of the disclosure.

FIG. 1B is a side schematic view of the slider 108 and magnetic recording medium 102 of FIG. 1A. The magnetic recording medium 102 comprises a lubricant layer (see FIG. 2) in accordance with one or more aspects of the disclosure. The slider 108 may comprise a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of the lubricant (not shown).

In operation, the laser 114 is configured to generate and direct light energy to a waveguide (e.g., along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 within or near the write element 108a, and near the read element 108b. The anticipated recording temperature is in the range of about 350° C. to 400° C. In the aspect illustrated in FIG. 1B, the laser directed light is disposed within the writer 108a and near a trailing edge of the slider. In other aspects, the laser directed light may instead be positioned between the writer 108a and the reader 108b. FIGs. 1A and 1B illustrate a specific example of a HAMR system. In other examples, the magnetic recording medium 102 with the lubricant layer according to aspects of the disclosure can be used in other suitable HAMR systems (e.g., with other sliders configured for HAMR).

Figure 2:
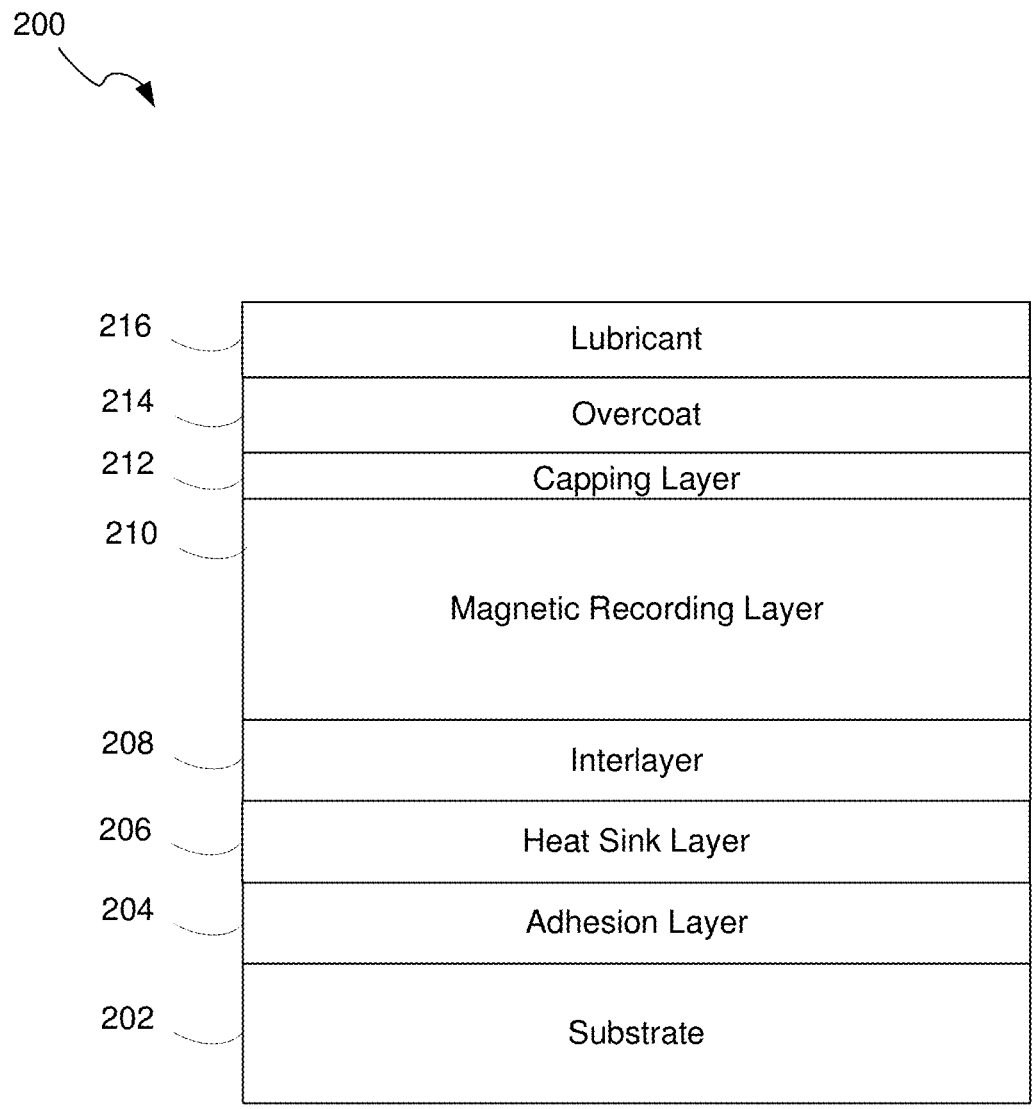
FIG. 2 is a side schematic view of a magnetic recording medium configured for magnetic recording media in accordance with one aspect of the disclosure.

FIG. 2 is a side schematic view of a magnetic recording medium 200 having a lubricant layer according to one or more aspects of the disclosure. In one aspect, the magnetic recording medium 200 may be used in a data storage system configured for HAMR (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. In one aspect, for disk drive applications, the substrate 202 can be made of one or more materials such as an Al alloy, NiP plated Al, glass, glass ceramic, and/or combinations thereof. In one aspect for magnetic tape recording applications, the substrate 202 can include a flexible material, such a film made of one of various types of resins, polyesters, polyolefins, polyamides, and the like, or combinations thereof. The substrate may include non-magnetic materials, and may be laminated. In some aspects, the magnetic recording medium 200 may have some or all of the layers illustrated in FIG. 2 and/or additional layer(s) in various stacking orders. It should also be noted that each layer shown in FIG. 2 may comprise one or more sub-layers. For example, the magnetic recording layer may comprise multiple layers in one or more aspects of the disclosure.

Lubricants

Lubricants according to aspects disclosed herein may function as boundary lubricants, may be utilized as mixed lubricants, may be utilized for elasto-hydrodynamic lubrication, and/or hydrodynamic lubrication. This classification is dependent on the contact/operation conditions, and the ratio of lubricant film thickness to the surface roughness.

Lubricants according to aspects disclosed herein may be used in various mechanical devices, including on the magnetic media of hard disk drives or tape drives and in conjunction with other microelectronic mechanical systems. Boundary lubricants may form a lubricant layer when one or more functional groups of the lubricant attach or otherwise engage with the surface being lubricated. For instance, one or more boundary lubricants may form the lubricant layer 216 on magnetic recording medium 200 (e.g., a disk that comprises a magnetic recording layer 210) that moves relative to other parts in the magnetic storage device. This lubricant layer 216 may help to protect the magnetic recording medium from friction, wear, contamination, smearing, and/or other damage caused by interactions between the magnetic recording medium and other parts in the storage device (e.g., interactions between a slider and the magnetic recording medium). In other words, this lubricating layer may help to prevent, or limit the effects of, solid-to-solid asperity contacts, friction, attrition, wear, and the other possible loss of chemical/mechanical robustness.

Lubricant Characteristics

Figure 3A:
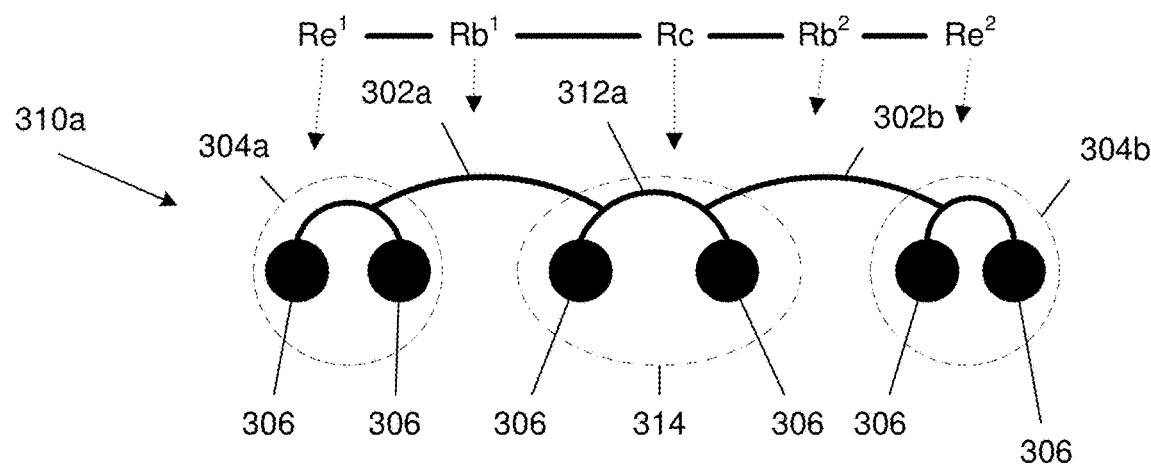
FIG. 3A is a schematic drawing showing a lubricant comprising two chain segments comprising terminal attachment groups separated by a linking segment according to one aspect of the disclosure.

FIGS. 3A-3D illustrate boundary lubricants according to various aspects of the disclosure. FIG. 3A shows an aspect in which the lubricant comprises two chain segments comprising terminal attachment groups separated by a linking segment. In the aspect as shown in FIG. 3A, the boundary lubricant generally referred to as 310a comprises or may have general formula (I):

$$Re^1 \text{—} Rb^1 \text{-} Rc \text{-} Rb^2 \text{—} Re^2 \qquad (I);$$

wherein the end segments $Re^1$ (304a) and $Re^2$ (304b) are as described herein; in this aspect there are two chain segments $Rb^1$ (302a) and $Rb^2$ (302b), which may also be referred to herein as side chain segments, both of which independently comprises a fluoroalkyl ether moiety, a fluoroalkenyl ether moiety, a perfluoroalkyl ether moiety, a perfluoroalkenyl ether moiety, or a combination thereof.

As is indicated in FIG. 3A, each of the side chain segments $Rb^1$ (302a) and $Rb^2$ (302b), is similar to one another in that each segment comprises a fluoroalkyl ether moiety, a fluoroalkenyl ether moiety, a perfluoroalkyl ether moiety, a perfluoroalkenyl ether moiety, or a combination thereof.

In the aspect shown in FIG. 3A, the lubricant may further comprise a divalent linking segment Rc (312a), generally indicated as (314), also referred to herein as a center segment, which is disposed between either end of the side chain segments 302a and 302b, and which comprises at least one anchoring functional group (306), which may be at least two anchoring functional groups, as defined herein.

Figure 3B:
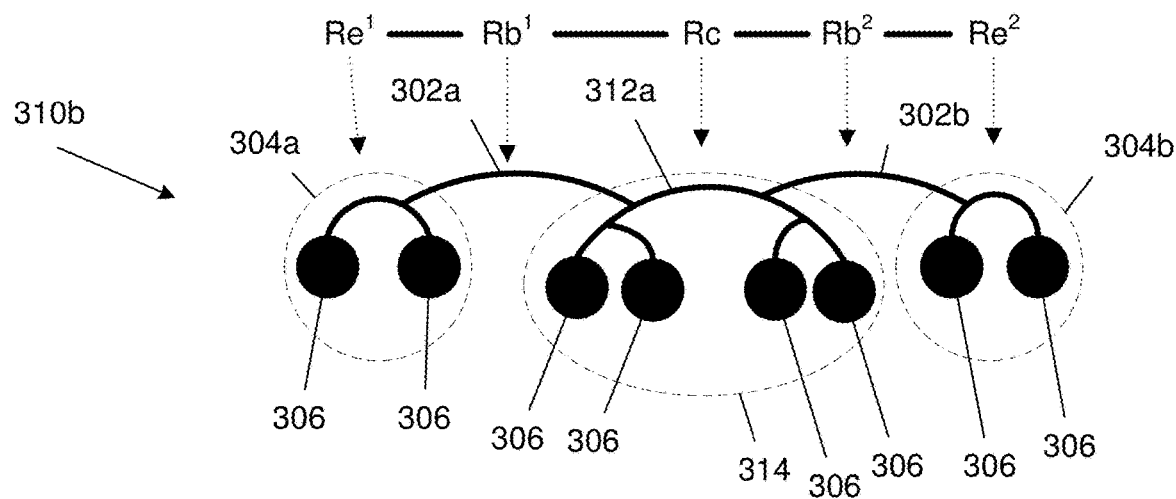
FIG. 3B is a schematic drawing showing a lubricant comprising two chain segments comprising terminal attachment groups and separated by a linking segment comprising a plurality of attachment groups according to one aspect of the disclosure.

FIG. 3B shows an aspect in which the lubricant comprises two chain segments $Rb^1$ (302a) and $Rb^2$ (302b) comprising terminal attachment groups 306, separated by a linking segment 312b comprising a plurality of attachment groups 306. As shown in FIG. 3B, in one aspect, generally indicated as 310b, the divalent linking segment Rc (312b), generally indicated as (314), may further comprise three or more anchoring functional groups 306, such as the four anchoring functional groups 306 depicted, which may be located on either end of, and/or within, the divalent linking segment 312b.

Figure 3C:
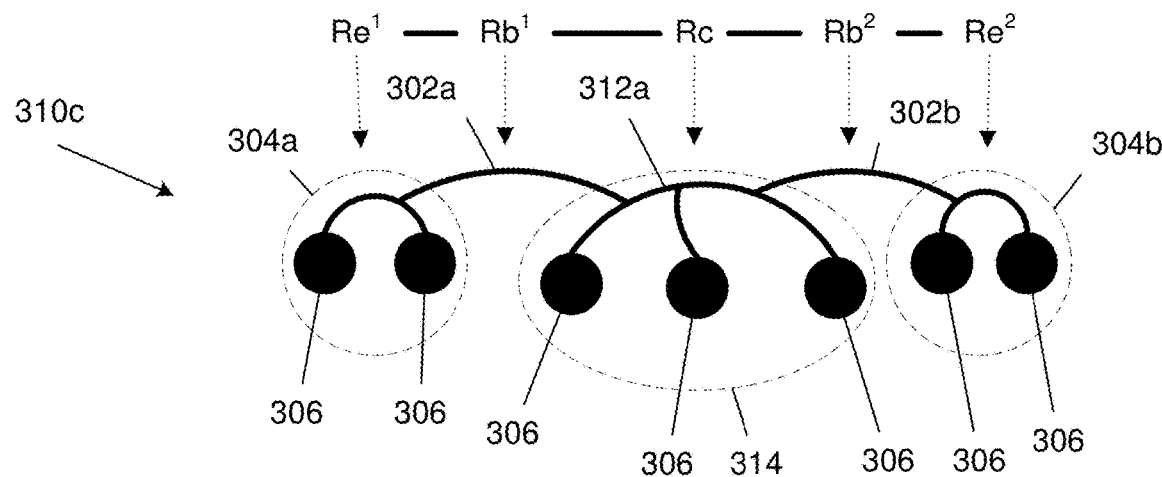
FIG. 3C is a schematic drawing showing a lubricant comprising two chain segments comprising terminal attachment groups separated by a branched linking segment comprising an attachment group on the branched chain according to one aspect of the disclosure.

FIG. 3C shows an aspect in which the lubricant comprises two chain segments $Rb^1$ (302a) and $Rb^2$ (302b) comprising terminal attachment groups 306 separated by a branched linking segment (312c), generally indicated as (314), comprising an attachment group on the branched chain according to one aspect of the disclosure. As shown in FIG. 3C, in one aspect, generally indicated as 310c, the divalent linking segment Rc (312c) comprises two chain segments comprising terminal attachment groups separated by a branched linking segment comprising an attachment group on the branched chain.

Figure 3D:
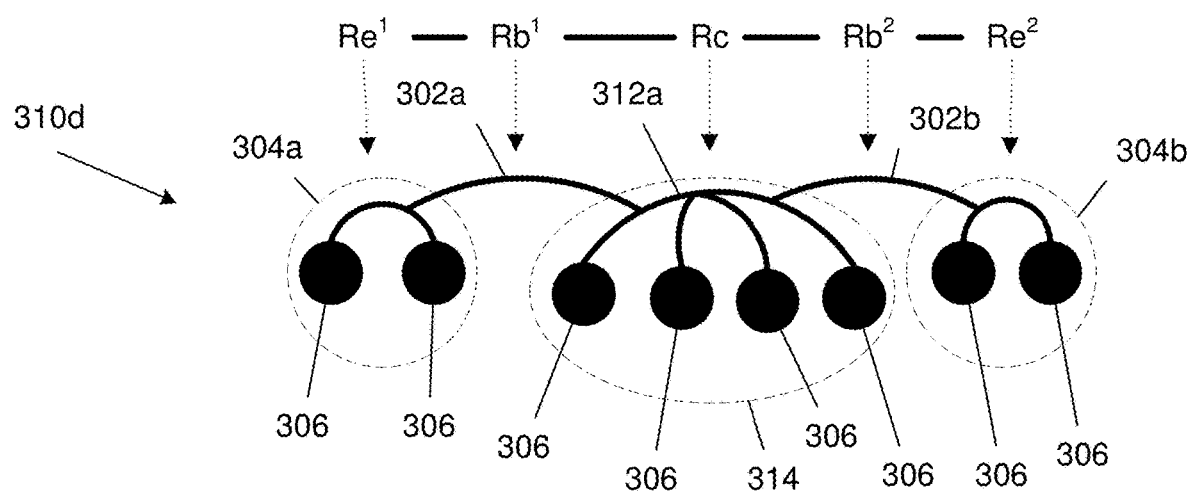
FIG. 3D is a schematic drawing showing a lubricant comprising two chain segments comprising terminal attachment groups separated by a branched linking segment comprising two attachment groups on the branched chain according to one aspect of the disclosure.

FIG. 3D shows an aspect in which the lubricant comprises two chain segments Rb$^1$ (302a) and Rb$^2$ (302b) comprising terminal attachment groups 306 separated by a branched linking segment (312c) comprising two attachment groups 306 on the branched chain according to one aspect of the disclosure. FIG. 3D shows an aspect generally indicated as 310d, in which the lubricant comprises two chain segments Rb$^1$ (302a) and Rb$^2$ (302b) comprising terminal attachment groups (306) separated by a divalent linking segment Rc (312d) which comprises a branched linking segment comprising two attachment groups (306) on the branched chain.

Accordingly, in one aspect, the divalent linking segment Rc may comprise two or more anchoring functional groups, or may further comprise three or more anchoring functional groups, or may further comprise four or more anchoring functional groups, or may further comprise five or more anchoring functional groups, or may further comprise six or more anchoring functional groups.

In one aspect, each anchoring functional group may independently comprise B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

In one aspect, one or more anchoring functional group may comprise, or is, a hydroxyl moiety (—OH). In one aspect, each anchoring functional group comprises a hydroxyl moiety (—OH). In one aspect, each anchoring functional group is a hydroxyl moiety (—OH).

Variations of the possible components of the lubricants of FIGS. 3A-3D are described in greater detail below.

Divalent Linking Segment

Various divalent linking segments may be used singularly or in combination in the lubricants described herein. In one aspect, a lubricant may comprise or have general formula (I):

(I);

wherein the divalent linking or center segment (Rc) further comprises one or more anchoring functional groups. In one aspect, Rc comprises or has general formula (II) or (IIa):

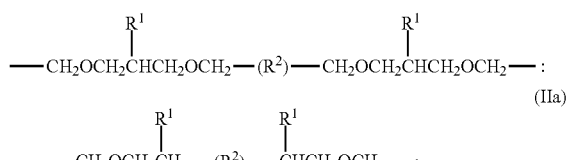

wherein R$^2$ may comprise or is according to general formula (i):

—(CR$^\#_2$)$_p$-    (i);

wherein p is from 4 to 20, or from 4 to 10, or from 4 to 6, or from 6 to 10; and
wherein z, when present, is from 1 to 10.

In another aspect, a lubricant may comprise or have general formula (I):

(I);

wherein the divalent linking or center segment Rc further comprises one or more anchoring functional groups. In one aspect, Rc comprises or has general formula (II) or (IIa):

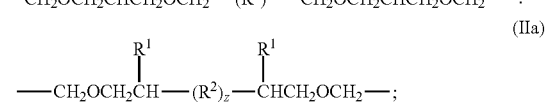

wherein R$^2$ may comprise or is according to general formula (ii):

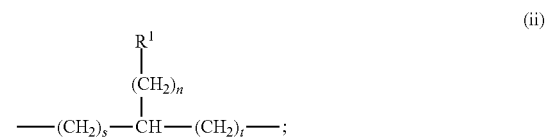

wherein s is from 0 to 10; wherein t is from 0 to 10; wherein n is from 1 to 10, wherein z, when present, is from 1 to 10, and wherein R$^1$ is an anchoring functional group as defined herein. Accordingly, in some aspects the divalent linking or center segment Rc may be, or is branched.

In another aspect, a lubricant may comprise or have general formula (I):

(I)

wherein the divalent linking or center segment Rc further comprises one or more anchoring functional groups. In one aspect, Rc comprises or has general formula (II) or (IIa):

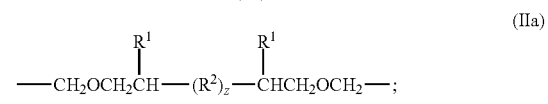

wherein R$^2$ may comprise or is according to general formula (iii):

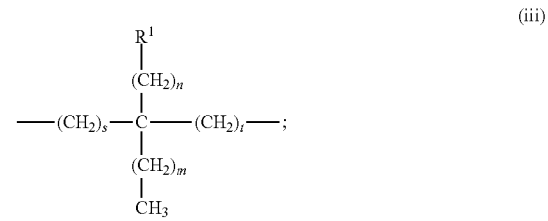

wherein s is from 0 to 10; wherein t is from 0 to 10; wherein n is from 1 to 10, wherein m is from 0 to 10; wherein z, when present, is from 1 to 10; and wherein $R^1$ is an anchoring functional group as defined herein. Accordingly, in some aspects the divalent linking or center segment Rc may be, or is branched on both sides of the linking segment.

In one example in which s=1, t=0, n=1 and m=0, the divalent linking segment Rc has the formula:

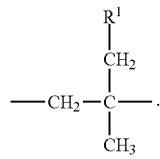

In another aspect, a lubricant may comprise or have general formula (I):

$$Re^1\text{—}Rb^1\text{-}Rc\text{-}Rb^2\text{—}Re^2 \quad (I)$$

wherein the divalent linking or center segment Rc further comprises one or more anchoring functional groups. In one aspect, Rc comprises or has general formula (II) or (IIa):

(II)

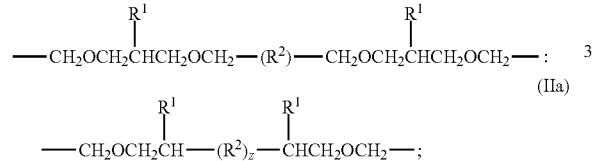

(IIa)

wherein $R^2$ may comprise or is according to general formula (iv):

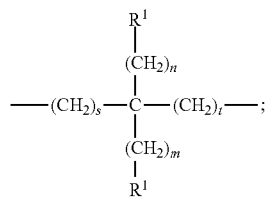

(iv)

wherein s is from 0 to 10; wherein t is from 0 to 10; wherein n is from 1 to 10; wherein m is from 0 to 10; wherein z, when present, is from 1 to 10; and wherein $R^1$ is an anchoring functional group as defined herein.

In another aspect, a lubricant may comprise or have general formula (I):

$$Re^1\text{—}Rb^1\text{-}Rc\text{-}Rb^2\text{—}Re^2 \quad (I)$$

wherein the divalent linking or center segment Rc further comprises one or more anchoring functional groups. In one aspect, Rc comprises or has general formula (II) or (IIa):

(II)

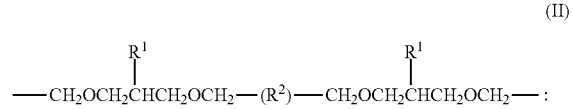

(IIa)

wherein $R^2$ may comprise or is according to general formula (v):

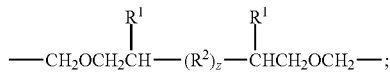

(v)

wherein n is from 1 to 10; wherein m is from 0 to 10; wherein z, when present, is from 1 to 10; and wherein each $R^\#$ is, independently H or F. In one exemplary aspect of the above general formula, wherein n=2 and m=0, the above general formula may comprise one or more of the formulae:

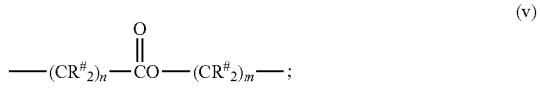

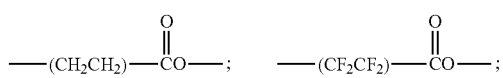

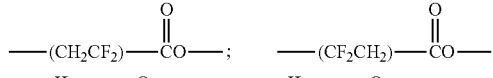

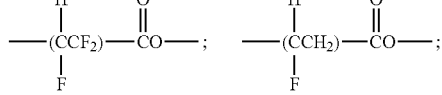

and/or

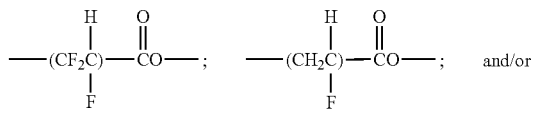

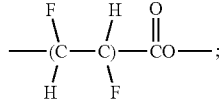

including the stereoisomers and racemic mixtures thereof.

In another aspect, a lubricant may comprise or have general formula (I):

$$Re^1\text{—}Rb^1\text{-}Rc\text{-}Rb^2\text{—}Re^2 \quad (I)$$

wherein the divalent linking or center segment Rc further comprises one or more anchoring functional groups. In one aspect, Rc comprises or has general formula (II) or (IIa):

(II)

(IIa)

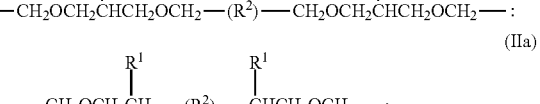

wherein $R^2$ may comprise or is according to general formula (vi):

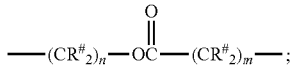
(vi)

wherein n is from 1 to 10; wherein m is from 0 to 10; wherein z, when present, is from 1 to 10; and wherein each R # is, independently H or F.

In one or more aspects, $R^2$ may further comprise one or more of general formulas (ia) through (va):

$$—CF_2CF_2CF_2O(CF_2CF_2CF_2CF_2O)_aCF_2CF_2CF_2—; \quad (ia)$$

$$—CF_2CF_2O(CF_2CF_2CF_2O)_aCF_2CF_2—; \quad (iia)$$

$$—CF_2CF_2O[CF(CF_3)CF_2O]_aCF_2CF_2—; \quad (iiia)$$

$$—CF_2O(CF_2CF_2O)_a(CF_2O)_bCF_2—; \quad (iva)$$

$$—CF_2O(CF_2CF_2O)_aCF_2—; \quad (va)$$

or a combination thereof; wherein each a is, independently from 1 to 20, and wherein each b, when present, is independently from 1 to 20.

In a related aspect, each $R^1$ present on the linking segment Rc is an anchoring functional group attachable to and/or engageable with a protective overcoat of a magnetic recording media, comprising: B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

Side Chain Segments

In one aspect, each of the side chain segments $Rb^1$ and $Rb^2$ comprises one or more of a fluoroalkyl ether moiety, a fluoroalkenyl ether moiety, a perfluoroalkyl ether moiety, a perfluoroalkenyl ether moiety, or a combination thereof. In one aspect, each chain segment present in the lubricant may comprise one or more of general formulas (ia) through (va):

$$—CF_2CF_2CF_2O(CF_2CF_2CF_2CF_2O)_aCF_2CF_2CF_2—; \quad (ia)$$

$$—CF_2CF_2O(CF_2CF_2CF_2O)_aCF_2CF_2—; \quad (iia)$$

$$—CF_2CF_2O[CF(CF_3)CF_2O]_aCF_2CF_2—; \quad (iiia)$$

$$—CF_2O(CF_2CF_2O)_a(CF_2O)_bCF_2—; \quad (iva)$$

$$—CF_2O(CF_2CF_2O)_aCF_2—; \quad (va)$$

or a combination thereof, wherein each a is, independently from 1 to 20, or from 1 to 10, or from 1 to 5, and wherein each b, when present, is independently from 1 to 20, or from 1 to 10, or from 1 to 5.

End Segment

In one aspect of the disclosure, each end segment $Re^1$ and $Re^2$ may independently comprise or may have the general formula (III):

(III)

wherein at least one $R^1$ is an anchoring functional group attachable to and/or engageable with a protective overcoat of a magnetic recording media, comprising: B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure. In one aspect, one or more anchoring functional group may comprise, or is a hydroxyl moiety (—OH). In one aspect, each anchoring functional group may comprise or is a hydroxyl moiety (—OH).

Exemplary Lubricant Structures

In one aspect, the lubricant comprises or has a structure according to general formula (IV):

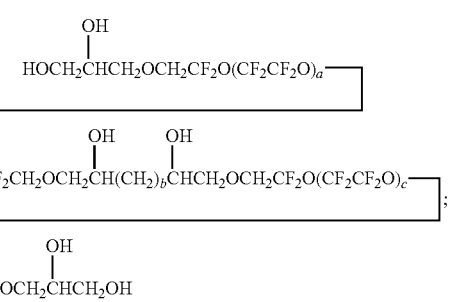
(IV)

wherein a is from 1 to 20, or 1 to 10, or 1 to 5; b is from 1 to 10; and c is from 1 to 20, or 1 to 10, or 1 to 5.

In one aspect of the disclosure, the lubricant comprises or has a structure according to general formula (V):

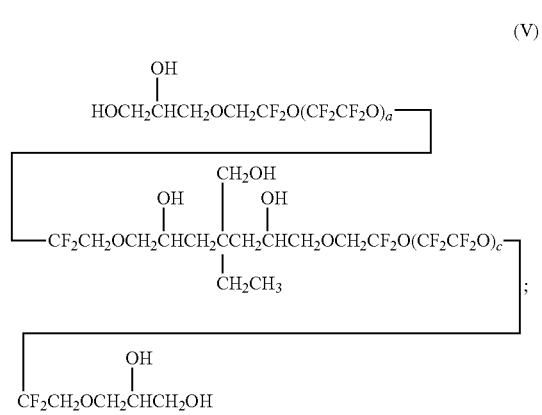
(V)

wherein a is from 1 to 20, or 1 to 10, or 1 to 5; and c is from 1 to 20, or 1 to 10, or 1 to 5.

In one aspect of the disclosure, the lubricant comprises or has a structure according to the general formula (VI):

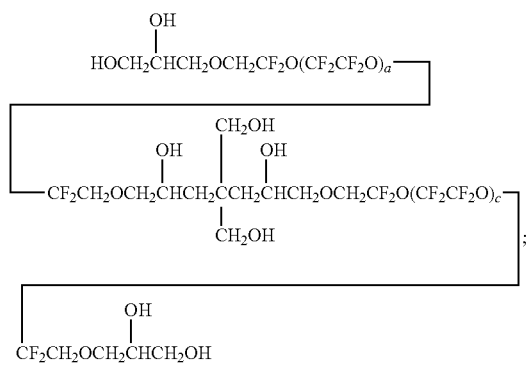

(VI)

wherein a is from 1 to 20, or 1 to 10, or 1 to 5; and c is from 1 to 20, or 1 to 10, or 1 to 5.

In one or more aspects, the lubricant is bidentate, tridentate, tetradentate, pentadentate, hexadentate, septedentate, octadentate, or higher. In one or more aspects, the lubricant is stable above about 250° C., or above about 290° C., or above about 300° C., or above about 325° C., or above about 350° C., when determined in air, nitrogen, helium, or 90 vol % helium 10 vol % oxygen.

In one or more aspects, the lubricant has a weight average molecular weight of greater than or equal to about 0.5 kiloDalton (kDa), or from about 1 to about 20 kDa, or from about 2 to about 10 kDa, or from about 3 to about 7 kDa, or from about 1 to about 5 kDa, or 2 to about 4 kDa.

In one or more aspects, the lubricant has a weight average molecular weight of greater than or equal to about 500 grams per mole (g/mol), or from about 500 to about 20,000 g/mol, or from about 2,000 to about 10,000 g/mol, or from about 3,000 to about 7,000 g/mol, or from about 1,000 to about 5,000 g/mol, or 2,000 to about 4,000 g/mol.

In one or more aspects, the lubricant is an essentially pure compound, having a polydispersity, defined as the number average molecular weight Mn divided by the weight average molecular weight Mw (Mn/Mw) from about 1 to 2, or from about 1 to about 1.5, or from about 1 to about 1.1, or from about 1 to about 1.05.

Returning to FIG. 2, in one or more aspects, the magnetic recording medium 200 has a stacked structure which comprises a lubricant layer 216 on the overcoat layer 214. The lubricant present in the layer may comprise a plurality of segments according to general formula (I):

$$Re^1—Rb^1\text{-}Rc\text{-}Rb^2—Re^2 \qquad (I);$$

wherein Rc is a divalent linking segment comprising general formula (II) or (IIa):

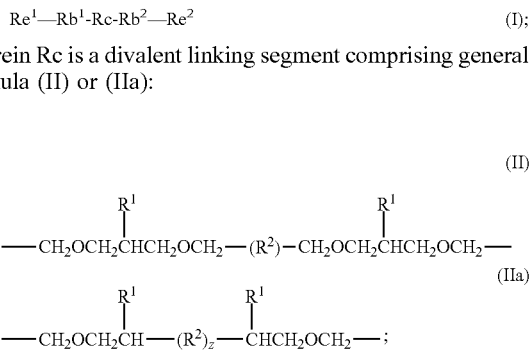

wherein $R^2$ comprises one or more of general formulas (i) through (vi):

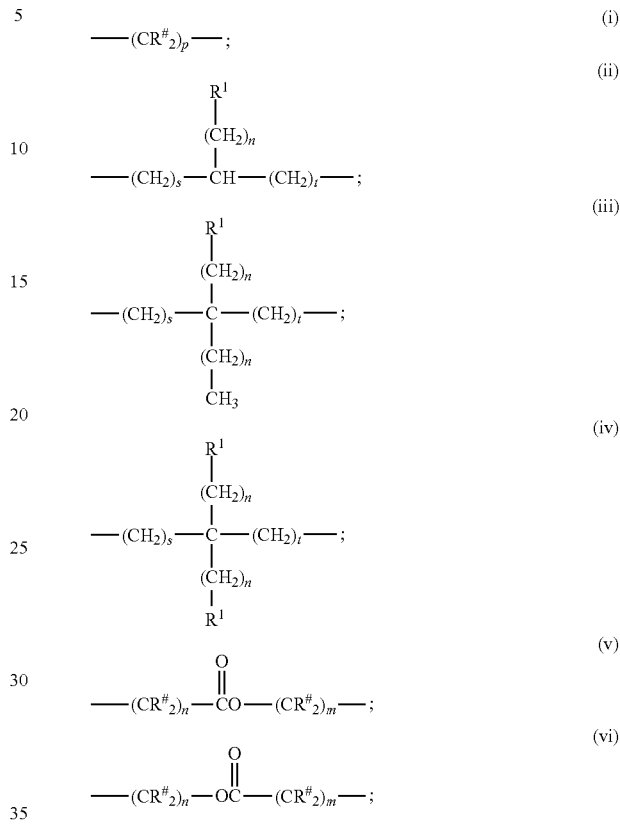

or a combination thereof;
wherein p, when present, is from 1 to 20;
wherein s, when present, is from 0 to 10;
wherein t, when present, is from 0 to 10;
wherein n, when present, is from 1 to 10;
wherein m, when present, is from 0 to 10;
wherein z, when present, is from 1 to 10;
wherein each $R^\#$, when present, is independently, H or F;
wherein each $R^1$ is an anchoring functional group engageable with a protective overcoat of a magnetic recording media;
wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and
wherein each of $Re^1$ and $Re^2$ independently comprises an anchoring functional group engageable with the protective overcoat of the magnetic recording media.

In one or more aspects, the average thickness of the lubricant layer of the magnetic recording medium is less than about 10 nm, or less than about 5 nm, or less than about 3 nm, or less than about 2 nm, or less than about 1 nm, or less about 0.9 nm, or less than or equal to about 0.8 nm. In some aspects, the lubricant of the magnetic recording medium has an average thickness from about 0.1 nm to about 10 nm, or from about 0.3 nm to about 1 nm.

In one or more aspects of the magnetic recording medium, the lubricant may have a bonding percentage of at least about 10%, or at least about 20%, or at least about 30%, or at least about 50%, or at least about 70%, or at least about 80%, or at least about 90%, and less than or equal to about 99%, or less than or equal to about 95%, corresponding to a post-stripping bonding level of the lubricant to the total area of an upper surface of the protective overcoat.

In one aspect, a magnetic data storage system may comprise a magnetic head; a magnetic recording medium according to any one or a combination of aspects disclosed herein comprising a lubricant according to one or more aspects disclosed herein, a drive mechanism for moving the magnetic head over the magnetic recording medium; and a controller electrically coupled to the magnetic head for controlling operation of the magnetic head.

Media Fabrication

Figure 4:
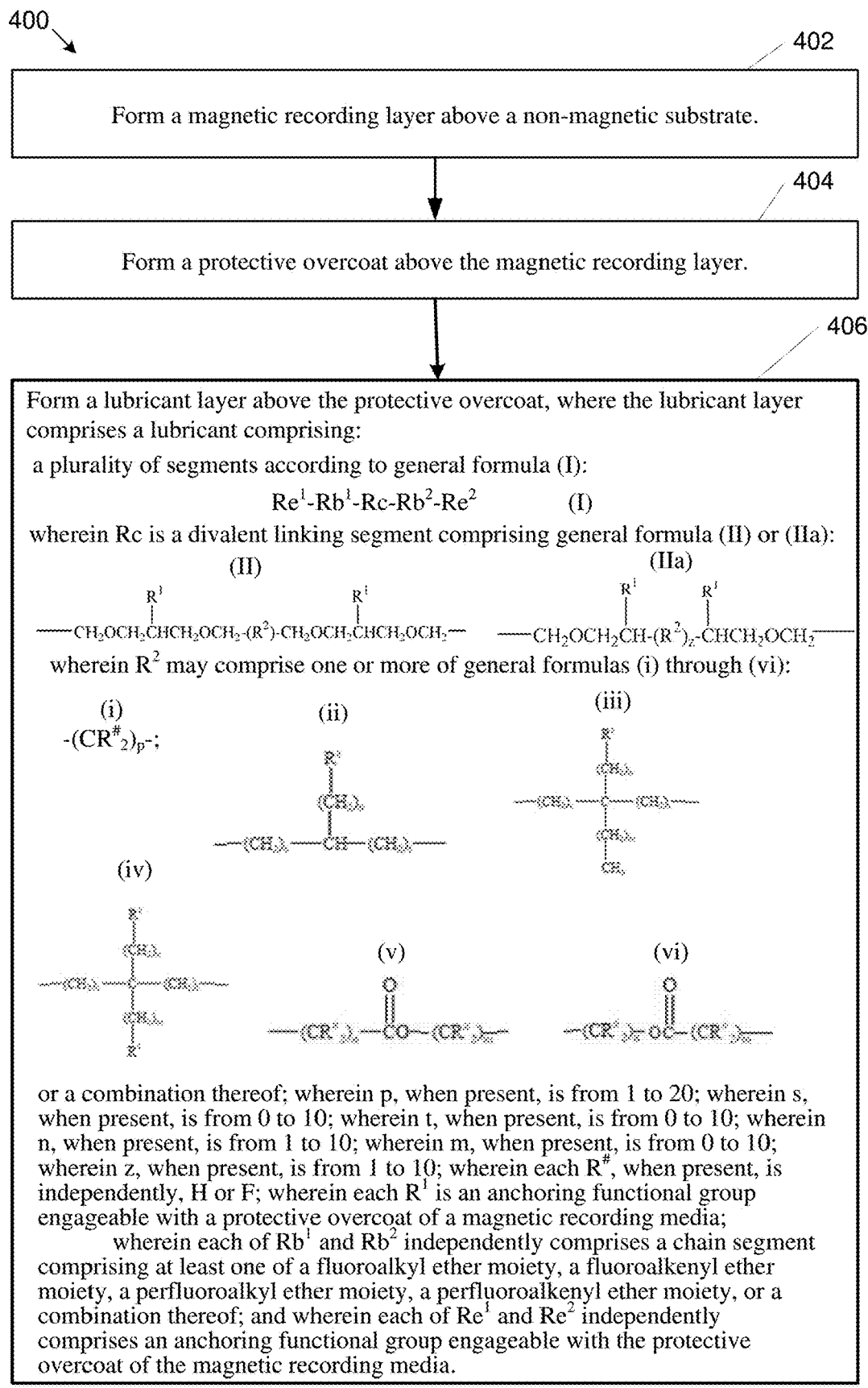
FIG. 4 is a flowchart of a method for forming a magnetic recording medium comprising a lubricant layer thereon, according to one aspect of the disclosure.

Referring to FIG. 4, a method 400 for forming a magnetic recording medium having a boundary lubricant layer is shown according to one aspect of the disclosure. As shown in FIG. 4, the method 400 comprises forming a magnetic recording layer above a substrate. See operation 402. In various approaches, the method 400 may also comprise forming other layers positioned between the substrate and the magnetic recording layer. These other layers may comprise, for example, one or more underlayers, soft underlayers, adhesion layers, and the like (e.g., any of the layers shown in FIG. 2).

As also shown in FIG. 4, the method 400 further comprises forming a protective overcoat above the magnetic recording layer and/or forming a capping layer on the magnetic layer and forming a protective overcoat layer on the capping layer. See operation 404. The method 400 further comprises forming a lubricant layer on the protective overcoat layer. See operation 406. This lubricant layer may comprise a lubricant according to one or more aspects disclosed herein.

It is important to note that in alternative approaches, the lubricant layer formed above the protective overcoat may comprise any of the multidentate perfluoropolyether boundary lubricants described herein, singly and/or in any combination.

In various aspects, the lubricant layer can be formed on the magnetic recording medium, specifically on the protective overcoat, via a dip coating method. For instance, in one aspect the magnetic recording medium may be dipped into a lubricant bath comprising the multidentate perfluoropolyether boundary lubricant according to one or more aspects of the disclosure and a fluorocarbon solvent such as HFE7100 or Vertrel-XF. After a predetermined amount of time, the magnetic recording medium may be removed from the lubricant bath at a controlled rate. The solvent may then evaporate, leaving behind a lubricant layer comprising the multidentate perfluoropolyether boundary lubricant. The bonding percentage is quantified by stripping the lubricated magnetic recording medium with the solvents used in the lubricant bath at various post-lube time periods.

The thickness of the lubricant layer may be tuned by controlling the submergence duration of the magnetic recording medium in the lubricant bath, the rate at which the magnetic recording medium is removed from the coating solution, the temperature of the lubricant bath, and/or the concentration of the boundary lubricant (e.g. the lubricant according to one or more aspects of the disclosure) in the lubricant bath.

In one or more aspects, the concentration of lubricant in the lubricant bath may be in a range from about 0.001 g/L to about 1 g/L. In yet other aspects, the concentration of the lubricant in the lubricant bath may be selected so as to achieve a resulting lubricant layer with a thickness in a range from about less than or equal to about 10 nanometers (nm), or less than or equal to about 5 nm, or less than or equal to about 1 nm, or from about 0.1 nm to less than about 5 nm, or from about 0.3 nm to less than about 1 nm.

Likewise, the formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art.

It should be noted that methodology presented herein for at least some of the various aspects may be implemented, in whole or in part, in computer hardware, by hand, using specialty equipment, and combinations thereof.

Moreover, any of the structures and/or steps may be implemented using known materials and/or techniques, as would become apparent to one skilled in the art.

In some aspects, the processes herein can perform the sequence of actions as shown in FIG. 4 in a different order. In other aspects, the processes can skip one or more of the actions. In still other aspects, one or more of the actions are performed simultaneously. In some aspects, additional actions can be performed. For example, in one aspect, the process may comprise any additional actions needed to fabricate the magnetic recording layer structure.

In some aspects, the forming or deposition of such layers can be performed using a variety of deposition sub-processes, comprising, but not limited to physical vapor deposition (PVD), direct current (DC) sputter deposition, ion beam deposition, radio frequency sputter deposition, or chemical vapor deposition (CVD), comprising plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "on," "above," "below," and "between" as used herein refer to a relative position of one layer with respect to other layers. As such, one layer deposited or disposed on/above or below another layer may be directly in contact with the other layer or may have one or more intervening layers. Moreover, one layer deposited or disposed between layers may be directly in contact with the layers or may have one or more intervening layers.

EXAMPLES

The following exemplary lubricant was prepared and evaluated according to standard methods in the art.

Sample 1 was prepared according to general formula (IV):

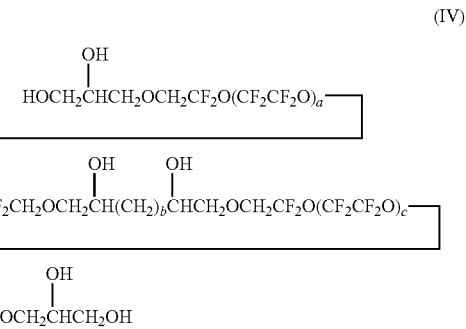

wherein a=5-9, b=2-6, and c=5-9. Sample 1 had an average molecular weight of about 3,000 g/mol and a polydispersity (Mw/Mn) from about 1.01 to 1.25.

The Comparative Sample was prepared according to the following formula:

wherein a=6-10. The Comparative Sample had an average molecular weight of about 1,700 g/mol with a polydispersity (Mw/Mn) from about 1.01 to 1.3.

Thermogravimetric Analysis—Thermal Stability

The samples were evaluated for thermal stability by thermogravimetric analysis in the indicated atmosphere according to standard methods in the art.

Figure 5A:
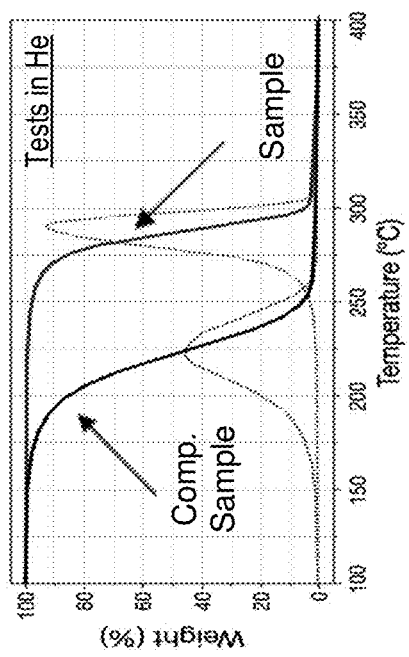
FIG. 5A is graph showing thermogravimetric analysis of lubricants in nitrogen according to aspects of the disclosure.

FIG. 5A is graph showing thermogravimetric analysis of lubricants in nitrogen according to aspects of the disclosure.

Figure 5B:
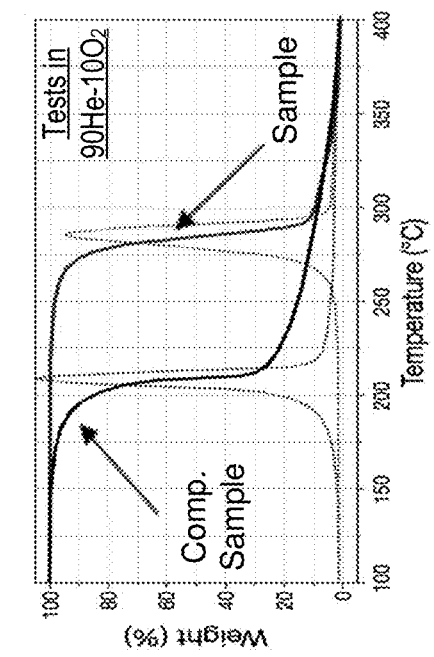
FIG. 5B is graph showing thermogravimetric analysis of lubricants in helium according to aspects of the disclosure.

FIG. 5B is graph showing thermogravimetric analysis of lubricants in helium according to aspects of the disclosure.

Figure 5C:
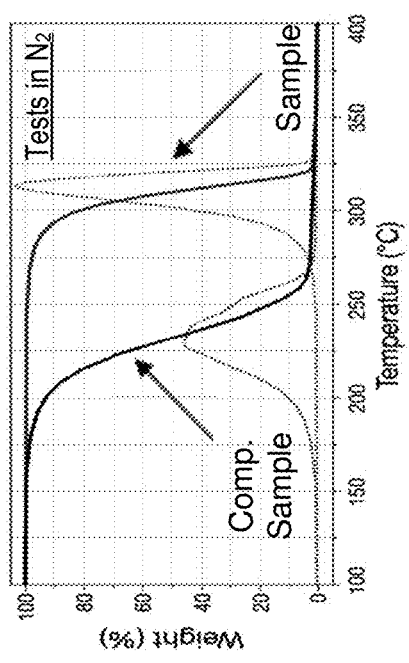
FIG. 5C is graph showing thermogravimetric analysis of lubricants in air according to aspects of the disclosure.

FIG. 5C is graph showing thermogravimetric analysis of lubricants in air according to aspects of the disclosure.

Figure 5D:
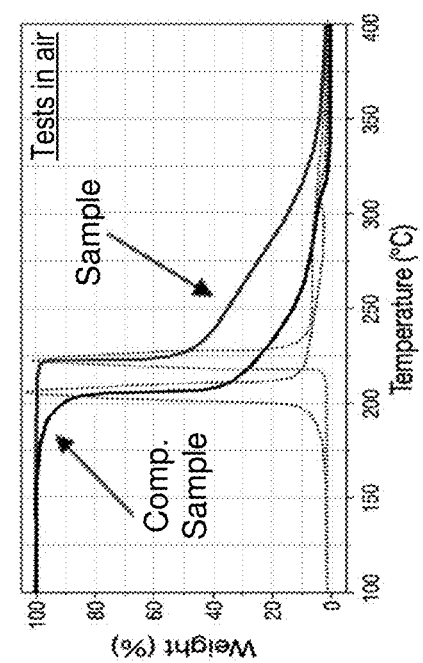
FIG. 5D is graph showing thermogravimetric analysis of lubricants in a mixture of helium and oxygen according to aspects of the disclosure.

FIG. 5D is graph showing thermogravimetric analysis of lubricants in a mixture of helium and oxygen according to aspects of the disclosure.

FIG. 5A through 5D present the above noted data, wherein the dotted lines represent the first derivative of the corresponding data. These data show a shift of weight loss curves (solid lines) to the high temperature end. The corresponding weight loss derivative peaks (dot lines) at high temperatures are shown for the exemplary lubricant. These data confirm that lubricants according to various aspects of the disclosure have remarkably improved thermal stability relative to the comparative example (which is a comparative lubricant used by the inventors in other similar applications), comprising significantly higher critical decomposition temperatures than the comparative example lubricant. The multi-dentate design enhances the thermal stability while making low-profile/short backbone lubricants possible.

Organic Si Contamination Robustness

The contamination robustness of these lubricants was evaluated via a lube barrier test in which, in an enclosed desiccator, lubed disks are exposed to a piece of organic contaminant gel at an elevated temperature (e.g., 50° C.-100° C.) for a suitable duration (e.g., 1-48 hours). The outgassing of contaminants are then captured by the disk surface in areas that are not covered/protected by the lubricant molecules. After the exposure test is completed, characteristic siloxane fragments on the disks are analyzed by time-of-flight secondary ion mass spectrometry or gas chromatography-mass spectroscopy (TOF-SIMS or GC-MS), and the results are presented as "Si Counts."

FIGS. 6A and 6B present these results or "Si Counts." In particular, these data reflect characteristic organic Si fragments on the disks analyzed by TOF-SIMS after siloxane exposure. The results are presented as "Si Counts" wherein the lower Si counts indicates a more robust performance of the disk to resist organic Si contaminations. As these data show, disks processed with a thinner layer of the exemplary lubricant (Sample 1) show much lower Si counts (i.e., higher Si robustness) than those processed with a thicker layer of the comparative lubricant.

Head Wear and Flyability

Figure 7A:
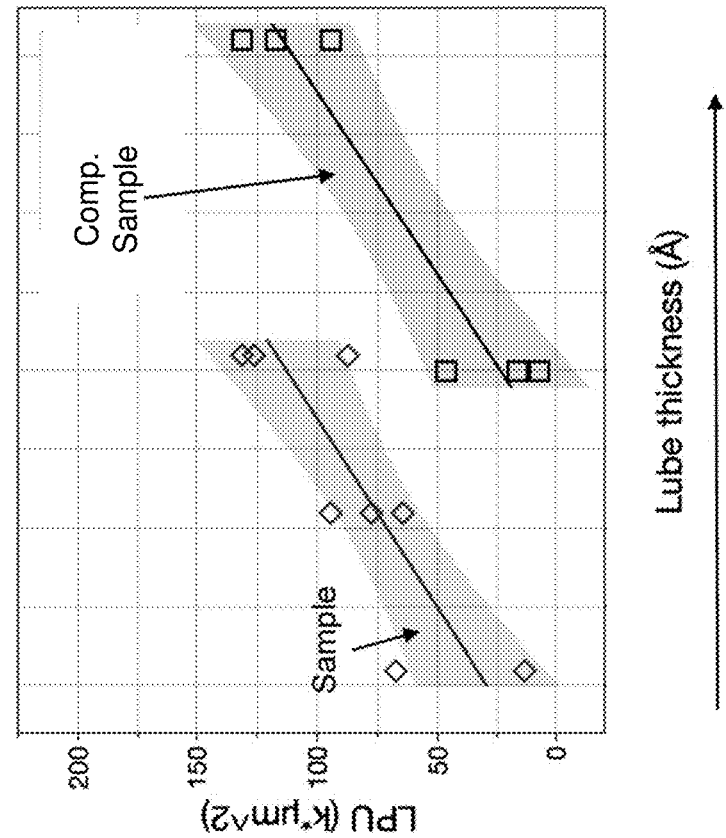
FIG. 7A is a graph showing the results of a spin-stand head wear evaluation of a lubricant according to one aspect of the disclosure.

FIG. 7A is a graph showing the results of a spin-stand head wear evaluation of a lubricant according to one aspect of the disclosure. The head wear performance of the lubricants was tested utilizing spin-stand techniques wherein the heads/sliders are tested by on-track sliding under over-push conditions in a helium ambient environment. Touchdown power is first measured on a reference track and used to define the 0 power [e.g., 0 milliWatt (mW)] touch-down (TD) plane, which is then defined by the thermal fly-height control (TFC) power that is required to cause the contact of the read/write pole tip with the reference track. The head/slider is then moved to a nearby track for a 20 mW over-push test, during which certain additional thermal protrusion by TFC is applied to the pole tip to ensure a stressful slider-disk contact throughout the continuous on-track sliding process. TD power is measured again after the on-track sliding test and the slider is moved back to the reference track. Head wear results are analyzed by evaluating the change in various TD parameters before and after the sliding tests of multiple heads and disks according to statistical methods common in the art.

Spin-stand head wear evaluation measures touchdown power changes of the heads before and after an on-track over-push sliding test. The greater the delta in the touchdown power (ATDP) is the higher the head wear incurred. A thinner design of the new lubricant (Sample1) confirms a slightly higher yet reasonable head wear performance profile under these stressful tests (See FIG. 7A).

Figure 7B:
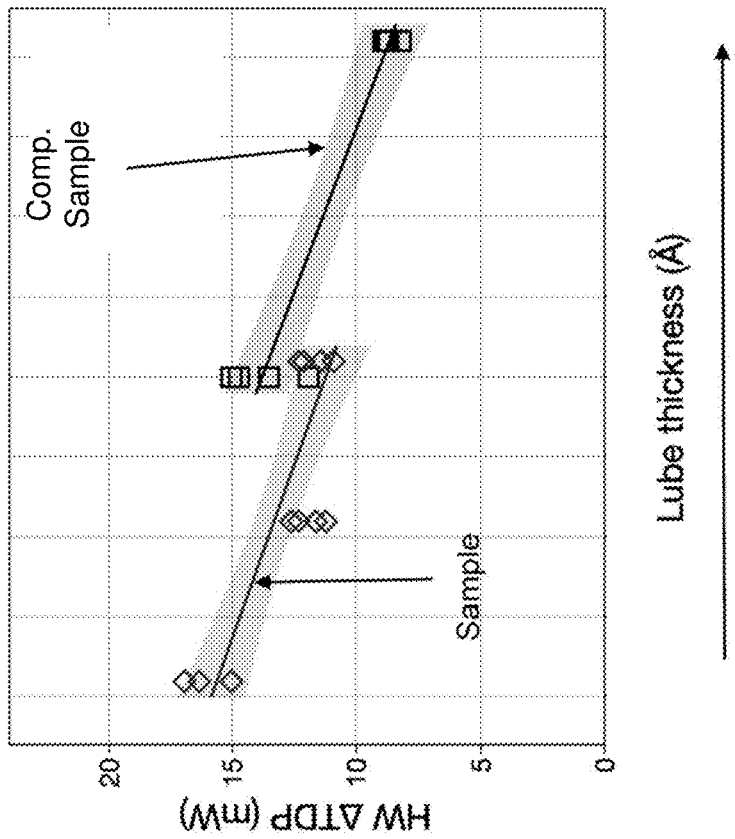
FIG. 7B is a graph showing the results of a lube pickup evaluation of a lubricant according to one aspect of the disclosure.

FIG. 7B is a graph showing the results of a lube pickup evaluation of a lubricant according to one aspect of the disclosure. Spin-stand tests conducted for lube pick-up "(LPU) tests" were conducted in which after sweeping multiple sliders on several disk surfaces at elevated temperatures in helium, the flyability performance is quantified by inspecting the LPU amounts on the air-bearing surface (ABS) utilizing an oil dipping and/or time-of-flight secondary ion mass spectrometry (TOF-SIMS) analysis method known in the art. The less LPU the better flyability. The new lubricant (Sample1) shows an improved flyability performance over the control lubricant (See FIG. 7B), which was later confirmed using TOF-SIMS analysis.

Recording Performance

The effects of the exemplary lubricants on the recording performance were evaluated according to standard drive tests using the corresponding data collected relative to the comparative lubricant. Change percentage of areal density capability (ADC) and delta touchdown power (ATDP) are evaluated. These data are shown in FIGS. 8A and 8B.

Figure 8B:
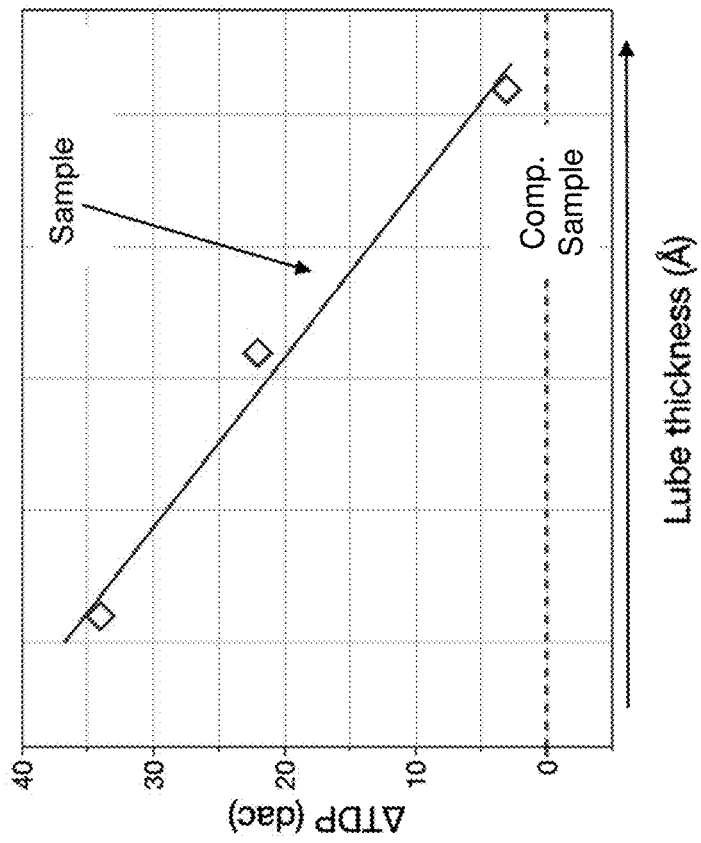
FIG. 8B is a graph showing the results of a delta touch-down power evaluation utilizing a lubricant according to one aspect of the disclosure.
Figure 8A:
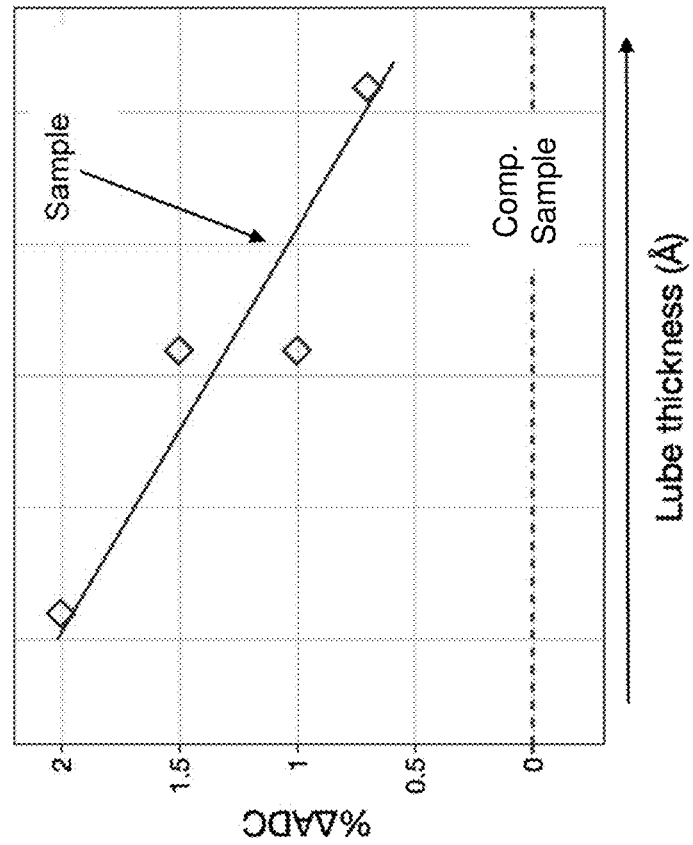
FIG. 8A is a graph showing the results of an areal density capability (ADC) evaluation utilizing a lubricant according to one aspect of the disclosure.

FIG. 8A is a graph showing the results of a change percentage of areal density capability (ADC) evaluation utilizing a lubricant according to one aspect of the disclosure.

FIG. 8B is a graph showing the results of a delta touchdown power evaluation utilizing a lubricant according to one aspect of the disclosure.

As these data in FIGS. 8A and 8B show, ADC gains can be obtained with the increased ATDP for the exemplary lubricant, indicating a head-media spacing gain enabled by the exemplary lubricant.

Processability

The processability of the inventive lubricant was determined relative to the comparative example. These data are shown in FIG. 9A through 9G.

FIG. 9A is a graph showing the processability of a lubricant according to one aspect of the disclosure indicated by lube thickness versus lube bath concentration.

FIG. 9B is a graph showing the processability of a lubricant according to one aspect of the disclosure indicated by circumferential lube thickness ranges versus lube thickness for the selected lubricant sample 1.

FIG. 9C is a graph showing the processability of a lubricant according to one aspect of the disclosure indicated by lube thickness standard deviation of the selected lubricant sample 1 versus its lube thickness.

FIG. 9D is a statistical summary of the data shown in FIG. 9C.

FIG. 9E is a graph showing the circumferential lube thickness ranges versus lube thickness for the comparative sample.

FIG. 9F is a graph showing lube thickness standard deviation of the comparative sample versus its lube thickness.

FIG. 9G is a statistical summary of the data shown in FIG. 9F.

As these data in FIGS. 9A-9G show, the processability of the inventive sample is feasible, as indicated by the lubricant thickness variations with the concentrations relative to the comparative example. Indeed, as these data confirm, an improved processing controllability/capability of the inventive lubricant may be provided. This is shown in FIG. 9B by the reduced circumferential thickness range (increased uniformity) relative to the average circumferential thickness range of the comparative sample (the data for the comparative sample being shown in FIG. 9E). FIG. 9D shows a decreased standard deviation of the lube thickness of the inventive sample, shown in FIGS. 9C and 9D, relative to the average standard deviation of lube thickness of the comparative sample (shown in FIG. 9G).

Bonding Ratio Percentage and Surface Energy

Figure 10:
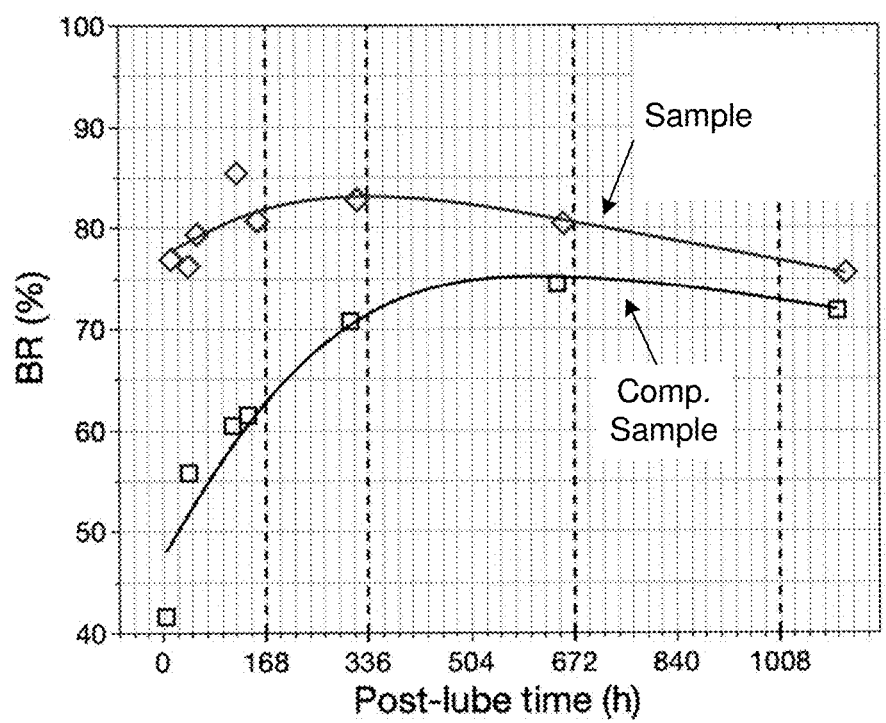
FIG. 10 is a graph showing the results of a bonding ratio percentage evaluation utilizing a lubricant according to one aspect of the disclosure.

FIG. 10 is a graph showing the results of a bonding ratio percentage evaluation utilizing Sample 1 and the comparative sample.

Figure 11A:
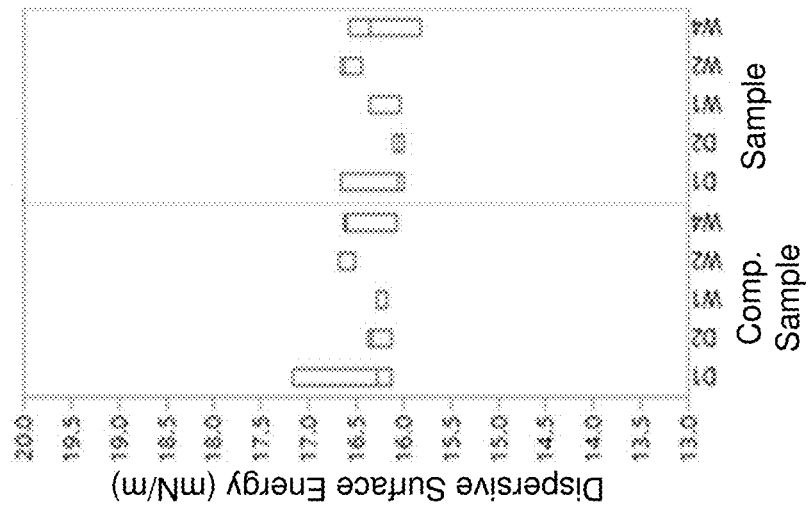
FIG. 11A is a graph showing the results of a polar surface energy evaluation utilizing a lubricant according to one aspect of the disclosure.

FIG. 11A is a graph showing the results of a polar surface energy evaluation utilizing Sample 1 and the comparative sample.

Figure 11B:
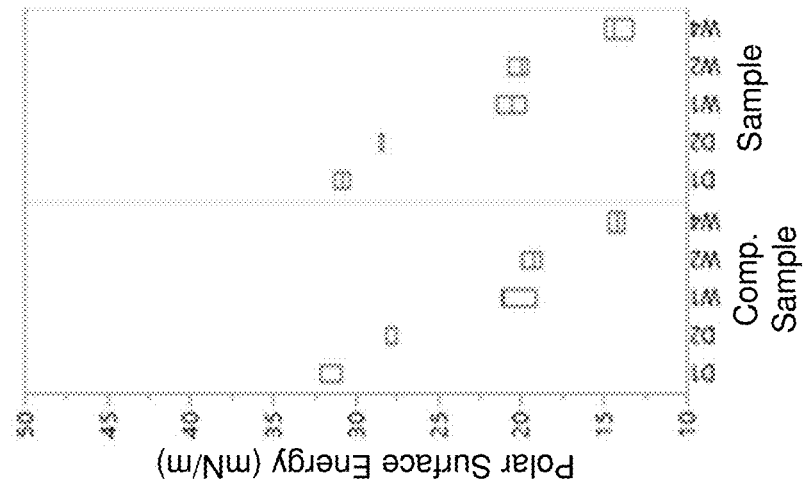
FIG. 11B is a graph showing the results of a dispersive surface energy evaluation utilizing a lubricant according to one aspect of the disclosure.

FIG. 11B is a graph showing the results of a dispersive surface energy evaluation utilizing Sample 1 and the comparative sample.

The bonding ratio percentage, the polar surface energy, and the dispersive surface energy were determined according to known methods in the art. As these data show, the exemplary lubricant reaches a higher saturated bonding ratio more quickly than the comparative example and also results in comparable surface coverage with respect to the comparative example as evidenced by the similar surface energy results shown in FIGS. 11A and 11B.

Accordingly, the lubricants according to aspects of this disclosure demonstrate improved thermal stability/oxidation resistance, improved contamination robustness, low profile for higher ADC with improved writability/readability, reasonable head wear and flyability performance, an improved bonding ratio, and improved processability with an increased uniformity. The lubricants according to aspects of this disclosure are suitable for use in high-temperature applications while maintaining or improving mechanical interface integration robustness, reliability, and magnetic spacing.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation comprising meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 20 angstroms (Å) refers to a thickness of 20 Å +/−2 Å, e.g., from 18 Å to 22 Å in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. In the disclosure various ranges in values may be specified, described and/or claimed. It is noted that when a range is specified, described and/or claimed in the specification and/or claims, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

As used in the specification and claims, "near" is inclusive of "at." The term "and/or" refers to both the inclusive "and" case and the exclusive "or" case, and such term is used herein for brevity. For example, a composition comprising "A and/or B" may comprise A alone, B alone, or both A and B.

Various components described in this specification may be described as "comprising" or "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is directly on another component and/or in another component (e.g., directly on a surface of a component or embedded in a component). Thus, for example, a first component that is over the second component may mean that (1) the first component is over the second component, but not directly touching the second component, (2) the first component is directly on (e.g., directly on a surface of) the second component, and/or (3) the first component is in (e.g., embedded in) the second component.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A lubricant comprising: a plurality of segments according to general formula (I):

$$Re^1—Rb^1-Rc-Rb^2—Re^2 \quad (I);$$

wherein Rc is a divalent linking segment comprising general formula (II) or (IIa):

(II)

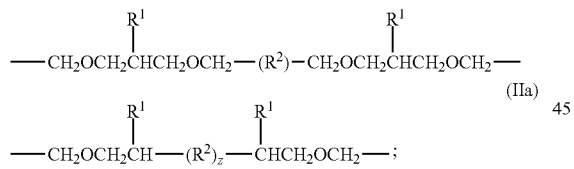

(IIa)

wherein $R^2$ comprises one or more of general formulas (ii) through (vi):

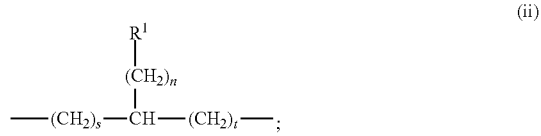

(ii)

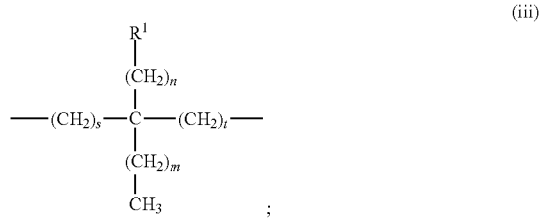

(iii)

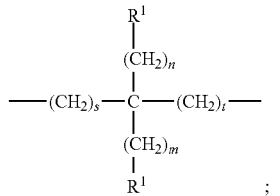

(iv)

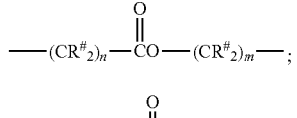

(v)

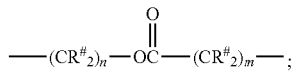

(vi)

or a combination thereof;

wherein p, when present, is from 1 to 20;

wherein s, when present, is from 0 to 10;

wherein t, when present, is from 0 to 10;

wherein n, when present, is from 1 to 10;

wherein m, when present, is from 0 to 10;

wherein z, when present, is from 1 to 10;

wherein each $R^\#$, when present, is independently, H or F;

wherein each $R^1$ is an anchoring functional group engageable with a protective overcoat of a magnetic recording media;

wherein each of $Rb^1$ and $Rb^2$ independently comprises a chain segment comprising at least one of a fluoroalkyl ether moiety, a fluoroalkenyl ether moiety, a perfluoroalkyl ether moiety, a perfluoroalkenyl ether moiety, or a combination thereof; and wherein each of $Re^1$ and $Re^2$ independently comprises two non-aromatic anchoring functional groups engageable with the protective overcoat of the magnetic recording media.

2. The lubricant of claim 1, wherein each anchoring functional group comprises, at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_2$-$C_{50}$ radical, a heteroaromatic $C_2$-$C_{50}$ radical, an alicyclic $C_3$-$C_{50}$ radical, and/or a heterocyclic $C_2$-$C_{50}$ radical, and wherein two or more R* may join together to form a ring structure.

3. The lubricant of claim 1, wherein at least one anchoring functional group comprises a hydroxyl moiety (—OH).

4. The lubricant of claim 1, wherein Rc comprises general formula (IIb):

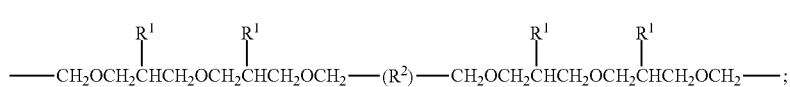
(IIb)

wherein R² comprises one or more of formulas (ii) through (vi):

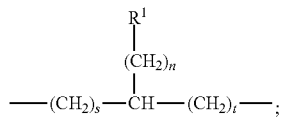
(ii)

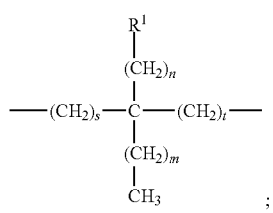
(iii)

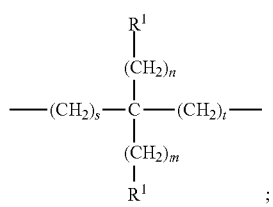
(iv)

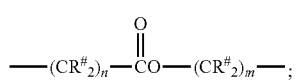
(v)

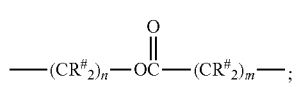
(vi)

or a combination thereof;

wherein s, when present, is from 0 to 10;

wherein t, when present, is from 0 to 10;

wherein n is from 1 to 10;

wherein m, when present, is from 0 to 10;

wherein each $R^\#$, when present, is independently, H or F;

wherein each $R^1$ comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_2$-$C_{50}$ radical, a heteroaromatic $C_2$-$C_{50}$ radical, an alicyclic $C_3$-$C_{50}$ radical, and/or a heterocyclic $C_2$-$C_{50}$ radical, and wherein two or more R* may join together to form a ring structure.

5. The lubricant of claim 4, wherein R² further comprises one or more of general formulas (ia) through (va):

—CF$_2$CF$_2$CF$_2$O(CF$_2$CF$_2$CF$_2$CF$_2$O)$_a$CF$_2$CF$_2$CF$_2$-;  (ia)

—CF$_2$CF$_2$O(CF$_2$CF$_2$CF$_2$O)$_a$CF$_2$CF$_2$-;  (iia)

—CF$_2$CF$_2$O[CF(CF$_3$)CF$_2$O]$_a$CF$_2$CF$_2$-;  (iiia)

—CF$_2$O(CF$_2$CF$_2$O)$_a$(CF$_2$O)$_b$CF$_2$-;  (iva)

—CF$_2$O(CF$_2$CF$_2$O)$_a$CF$_2$-;  (va)

or a combination thereof;

wherein each a is, independently from 1 to 20, and wherein each b, when present, is independently from 1 to 20.

6. The lubricant of claim 4, wherein at least one anchoring functional group comprises a hydroxyl moiety (—OH).

7. The lubricant of claim 1, wherein each of $Rb^1$ and $Rb^2$ independently comprises one or more of general formulas (ia) through (va):

—CF$_2$CF$_2$CF$_2$O(CF$_2$CF$_2$CF$_2$CF$_2$O)$_a$CF$_2$CF$_2$CF$_2$-;  (ia)

—CF$_2$CF$_2$O(CF$_2$CF$_2$CF$_2$O)$_a$CF$_2$CF$_2$-;  (iia)

—CF$_2$CF$_2$O[CF(CF$_3$)CF$_2$O]$_a$CF$_2$CF$_2$-;  (iiia)

—CF$_2$O(CF$_2$CF$_2$O)$_a$(CF$_2$O)$_b$CF$_2$-;  (iva)

—CF$_2$O(CF$_2$CF$_2$O)$_a$CF$_2$-;  (va)

or a combination thereof, wherein each a is, independently from 1 to 20, and wherein each b, when present, is independently from 1 to 20.

8. The lubricant of claim 1, wherein each of $Re^1$ and $Re^e$ independently comprises general formula (III):

(III)

wherein each $R^1$ is an anchoring functional group engageable with the protective overcoat of the magnetic recording media, and comprises at least one of: B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$—SiR*$_3$, —(CF$_2$)$_q$—SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_2$-$C_{50}$ radical, a heteroaromatic $C_2$-$C_{50}$ radical, an alicyclic $C_3$-$C_{50}$ radical, and/or a heterocyclic $C_2$-$C_{50}$ radical, and wherein two or more R* may join together to form a ring structure.

9. The lubricant of claim 8, wherein at least one anchoring functional group comprises a hydroxyl moiety (—OH).

10. The lubricant of claim 1, wherein the general formula (I)

$$Re^1\!-\!Rb^1\!-\!Rc\!-\!Rb^2\!-\!Re^2 \qquad (I);$$

comprises general formula (V):

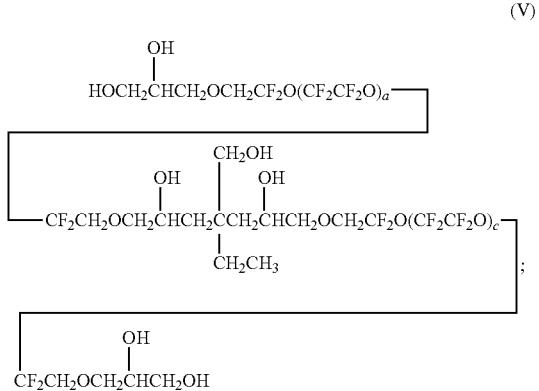

(V)

wherein a is from 1 to 20; and c is from 1 to 20.

11. The lubricant of claim 1, wherein the general formula (I)

$$Re^1\!-\!Rb^1\!-\!Rc\!-\!Rb^2\!-\!Re^2 \qquad (I);$$

comprises general formula (VI):

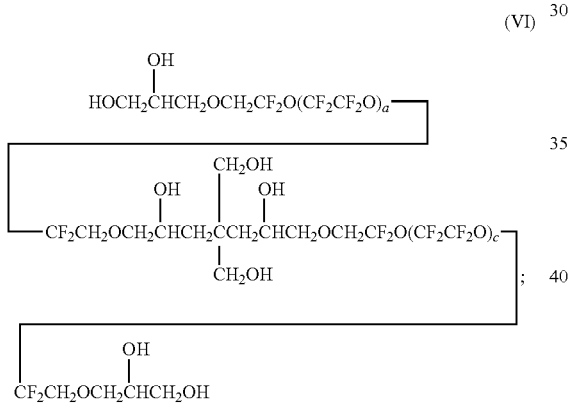

(VI)

wherein a is from 1 to 20; and c is from 1 to 20.

12. The lubricant of claim 1, comprising a weight average molecular weight from about 0.5 to 20 kiloDaltons (kDa), a polydispersity of greater than or equal to about 1 and less than or equal to about 2, or a combination thereof.

13. The lubricant of claim 1, comprising a dewetting thickness of less than or equal to about 10 nanometers.

14. The lubricant of claim 1, comprising a dewetting thickness of less than or equal to about 0.9 nanometers.

15. A magnetic recording medium, comprising:
a magnetic recording layer on a substrate;
a protective overcoat on the magnetic recording layer; and
a lubricant layer comprising the lubricant according to claim 1 on the protective overcoat.

16. The magnetic recording medium of claim 15, wherein the lubricant has a bonding percentage of about 10% to less than 100%, corresponding to a degree of bonding of the lubricant to the total area of an upper surface of the protective overcoat.

17. The magnetic recording medium of claim 15, wherein the lubricant comprises a dewetting thickness of less than or equal to about 10 nanometers.

18. A data storage system, comprising:
at least one magnetic head;
a magnetic recording medium comprising the lubricant of claim 1;
a drive mechanism for positioning the at least one magnetic head over the magnetic recording medium; and
a controller electrically coupled to the at least one magnetic head for controlling operation of the at least one magnetic head.

19. A data storage system, comprising:
a slider comprising at least one magnetic head and an air bearing surface (ABS), wherein a lubricant according to claim 1 is disposed on the ABS; and
a magnetic recording medium comprising a magnetic recording layer;
wherein the slider is configured to write information to the magnetic recording layer.

* * * * *